US012646049B2

(12) United States Patent
Seethalakshmi et al.

(10) Patent No.: US 12,646,049 B2
(45) Date of Patent: Jun. 2, 2026

(54) DISTRIBUTED IDENTITY (DID)-BASED ESTABLISHMENT OF CONNECTION BETWEEN ELECTRONIC DEVICES

(71) Applicant: SONY GROUP CORPORATION, Tokyo (JP)

(72) Inventors: Prashant Seethalakshmi, Bengaluru (IN); Takashi Togame, Bengaluru (IN); Sadayoshi Murao, Bengaluru (IN); Srinivasa Pingili, Bengaluru (IN)

(73) Assignee: SONY GROUP CORPORATION, Tokyo (JP)

( * ) Notice: Subject to any disclaimer, the term of this patent is extended or adjusted under 35 U.S.C. 154(b) by 87 days.

(21) Appl. No.: 18/611,523

(22) Filed: Mar. 20, 2024

(65) Prior Publication Data

US 2024/0330903 A1 Oct. 3, 2024

Related U.S. Application Data

(60) Provisional application No. 63/493,248, filed on Mar. 30, 2023.

(51) Int. Cl.
*G06Q 20/00* (2012.01)
*G06Q 20/36* (2012.01)

(52) U.S. Cl.
CPC ................................. *G06Q 20/3674* (2013.01)

(58) Field of Classification Search
CPC .... G06Q 20/3674; G06Q 20/36; G06F 21/33; G06F 21/64; H04L 9/0894; H04L 9/50
USPC .......................... 705/16, 21, 59; 380/44, 262
See application file for complete search history.

(56) References Cited

U.S. PATENT DOCUMENTS 11,195,169 B1 12/2021 Hartman
2022/0277295 A1* 9/2022 Robinson-Morgan ......................
G06Q 20/40145

FOREIGN PATENT DOCUMENTS

WO 2021/183694 A1 9/2021
WO 2023/034284 A1 3/2023

OTHER PUBLICATIONS

Bruno Miguel Gomes Fernandes, "Self-Sovereign Identity Decentralized Identifiers, Claims and Credentials using non Decentralized Ledger Technology", Universidade do Minho, Nov. 2021, 102 pages.

* cited by examiner

*Primary Examiner* — Dante Ravetti
(74) *Attorney, Agent, or Firm* — CHIP LAW GROUP

(57) ABSTRACT

A first electronic device implemented for establishment of a connection with other electronic devices based on a distributed identity (DID). The first electronic device creates a first wallet account for a first user associated with a second electronic device, based on a first credentials associated with the first user. Further, the first electronic device generates a second credentials associated with the first user and receives first notification information including a first verification status of the second credentials. Further, the first electronic device generates a third credentials associated with the first user and receives second notification information including a second verification status of the generated third credentials. The first electronic device stores the third credentials on the first electronic device. The second electronic device establishes a connection with the first electronic device using the stored third credentials.

19 Claims, 9 Drawing Sheets

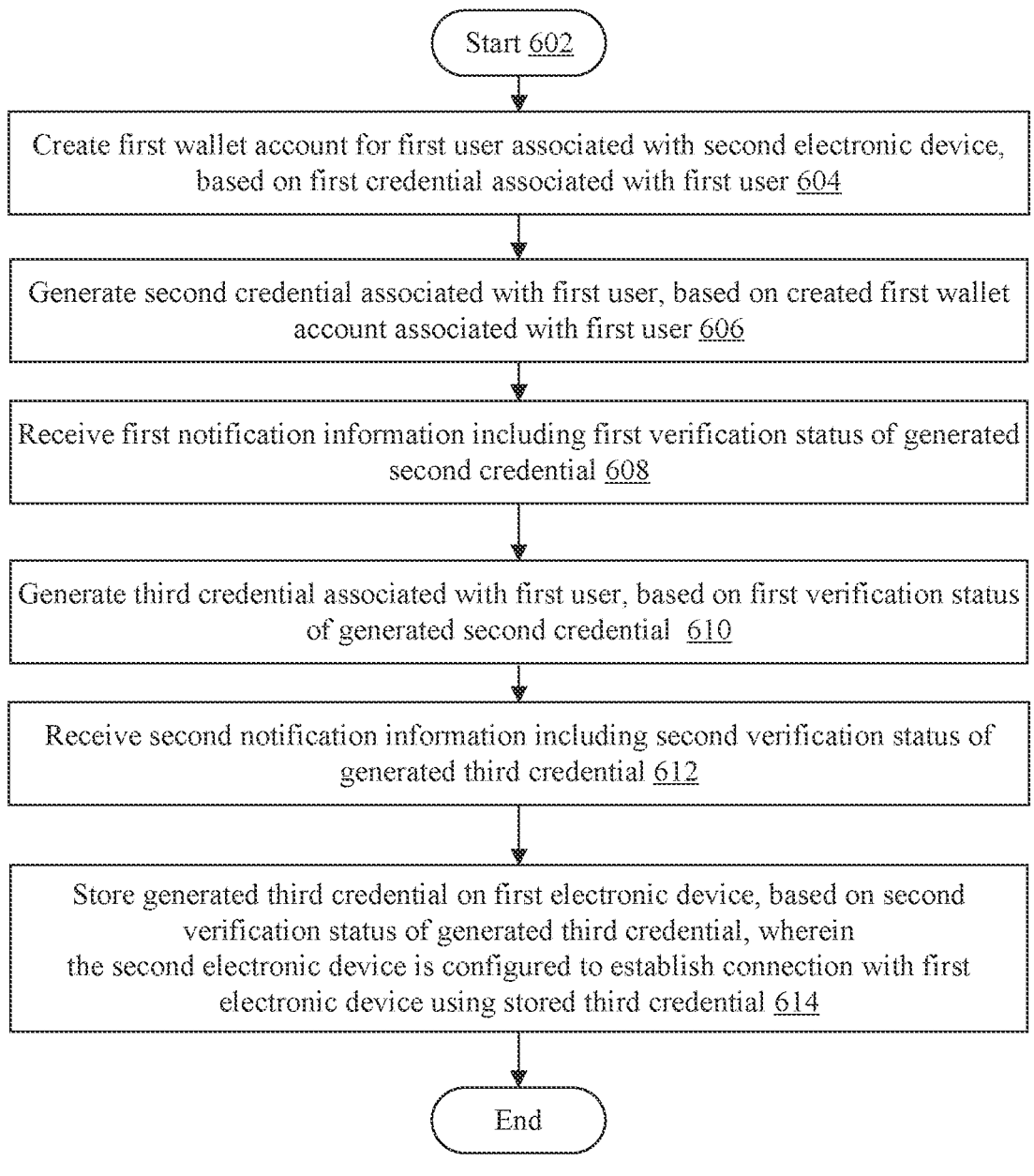

Start 602

Create first wallet account for first user associated with second electronic device, based on first credential associated with first user 604

Generate second credential associated with first user, based on created first wallet account associated with first user 606

Receive first notification information including first verification status of generated second credential 608

Generate third credential associated with first user, based on first verification status of generated second credential 610

Receive second notification information including second verification status of generated third credential 612

Store generated third credential on first electronic device, based on second verification status of generated third credential, wherein the second electronic device is configured to establish connection with first electronic device using stored third credential 614

End

FIG. 6

DISTRIBUTED IDENTITY (DID)-BASED ESTABLISHMENT OF CONNECTION BETWEEN ELECTRONIC DEVICES

CROSS-REFERENCE TO RELATED APPLICATIONS/INCORPORATION BY REFERENCE

This Application also makes reference to U.S. Provisional Application Ser. No. 63/493,248, which was filed on Mar. 30, 2023. The above stated Patent Applications are hereby incorporated herein by reference in their entirety.

FIELD

Various embodiments of the disclosure relate to establishment of connection between electronic devices. More specifically, various embodiments of the disclosure relate to an electronic device and method for distributed identity (DID)-based establishment connection.

BACKGROUND

Distributed Identity (DID) or Decentralized Identity (DID) may refer to a digital identity of an entity or a user that may be verifiable by a set of decentralized tokens connected to a distributed computing network, without the need for a central controller. In an example, the DID of an entity or a user may be created as a digital token that may be stored on a blockchain ledger. The DID may offer many ways of authentication, where some authentication may be private, such as, zero knowledge authentication. The DID authentication process may use digital tokens that have unique features when associated DID or decentralized identifier. The DID may provide identity without any third party involved.

Typically, a digital wallet is created such that the DID may be stored securely on the blockchain. The user may use the DID for any identity validation that ensures the security of the data stored in the digital wallet. Typically, for such a DID creation, there may be no streamlined process to establish connection between various entities. The connection establishment between various entities may be cumbersome and a time-consuming process that may require a mobile device for authentication. For example, authentication of the user may be performed by the mobile device. In such a case, the authentication process may be a network-oriented process. Further, during the authentication process, sensitive information (such as, name, email address, or organization name etc.) associated with the user, the organization, or the person associated with the organization may be available to the mobile device only. This may rise limitations concerns, such as, network connectivity and storage. In case the mobile device that is to authenticate the user experiences a system failure, then the authentication process may be abrupted in midst.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for distributed identity (DID) based establishment of connection between electronic devices is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 6 illustrates an exemplary flowchart of a method for DID based establishment of connection between electronic devices, in accordance with an embodiment of the disclosure.

DETAILED DESCRIPTION

Figure 1:
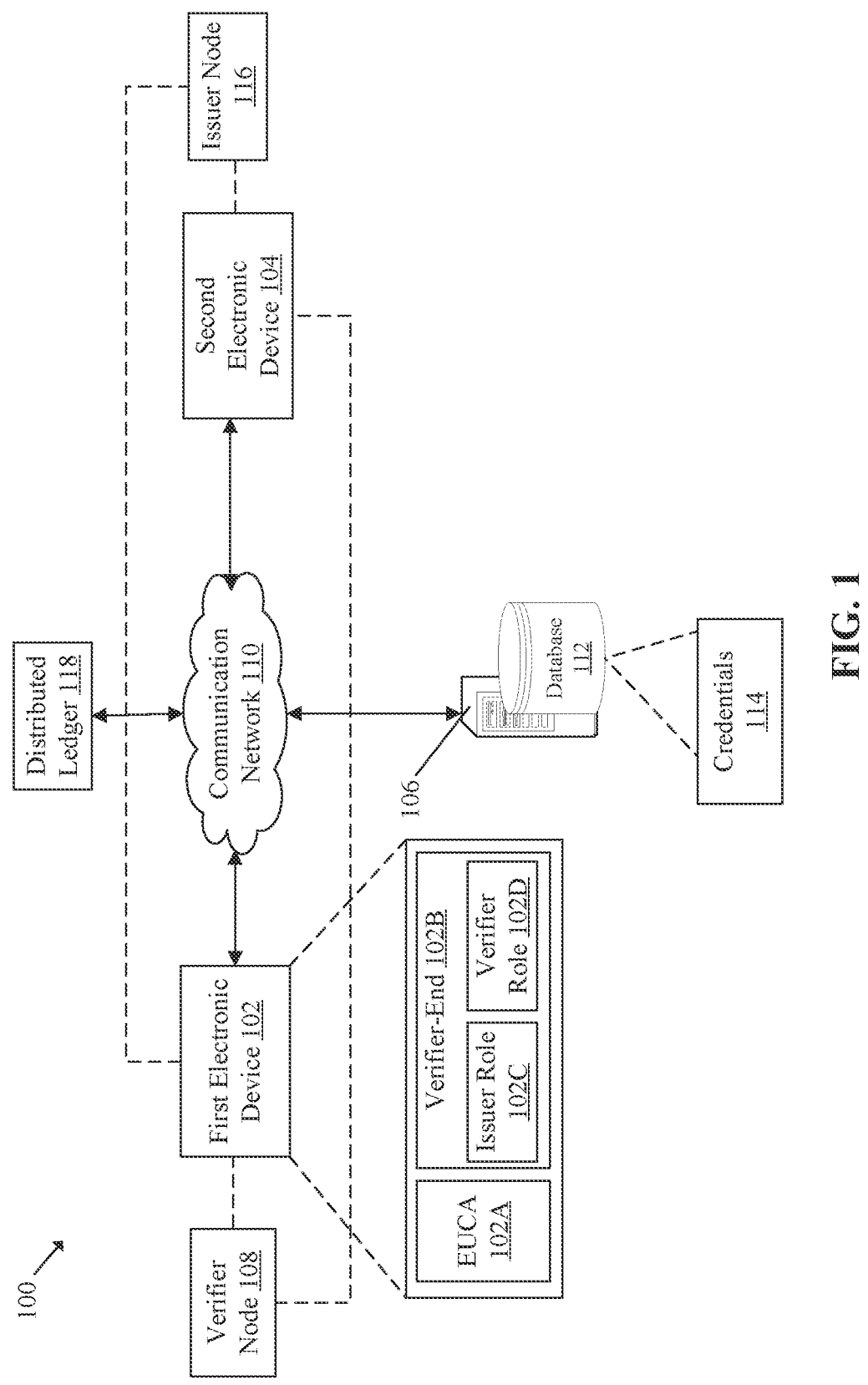
FIG. 1 is a block diagram that illustrates an exemplary network environment for distributed identity (DID) based establishment of connection between electronic devices, in accordance with an embodiment of the disclosure.

The following described implementations may be found in the disclosed electronic device and method for distributed identity (DID)-based establishment of connection between electronic devices. The disclosed electronic device may be a part of an end user cloud agent (EUCA) system that may facilitate verification of a user using a plurality of verified credentials. The EUCA system may include a plurality of credentials providers. Each credentials provider of the plurality of credentials providers may have secure data ownership and may control co-use of relevant transaction records through a distributed ledger. The co-use of relevant transaction records may enhance connectivity between the various electronic devices.

Exemplary aspects of the disclosure provide a first electronic device for distributed identity (DID)-based establishment of connection between electronic devices. The first electronic may create a first wallet account for a first user associated with a second electronic device, based on a first credentials associated with the first user. The first electronic device may generate a second credentials associated with the first user, based on the creation of the first wallet account associated with the first user. The first electronic device may receive first notification information including a first verification status of the generated second credentials. The first electronic device may generate a third credentials associated with the first user, based on the first verification status of the generated second credentials. The first electronic device may receive second notification information including a second verification status of the generated third credentials. Furthermore, the first electronic device may store the generated third credentials on the first electronic device, based on the second verification status of the generated third credentials. The second electronic device may be configured to establish a connection with the first electronic device using the stored third credentials.

Typically, a digital wallet is created such that the DID may be stored securely on the blockchain. The user may use the DID for any identity validation that ensures the security of the data stored in the digital wallet. Typically, for such a DID creation, there may be no streamlined process to establish connection between various entities. The connection establishment between various entities may be cumbersome and a time-consuming process that may require a mobile device for authentication. For example, authentication of the user may be performed by the mobile device. In such a case, the authentication process may be a network-oriented process. Further, during the authentication process, sensitive information (such as, name, email address, or organization name etc.) associated with the user, the organization, or the person associated with the organization may be available to the mobile device only. This may rise limitations concerns, such as, network connectivity and storage. In case the mobile device authenticating the user experiences a system failure, then the authentication process may be abrupted in middle of the authentication process. Thus, it may be desired to eliminate the limitation of authentication due to the mobile device.

On the contrary, the disclosed first electronic device that may use the DID and associated the first electronic device for various operations, such as creation of a wallet account, creation of plurality of credentials, verification of the plurality of credentials for authentication of a user. Further, the first electronic device may synchronize a plurality of credentials to mirror the digital wallet account present in the first electronic device or the second electronic device. The present disclosed first electronic device may eliminate the limitation of network and storage, as the authentication may be performed on a cloud agent (such as, first electronic device) instead of the user device (such as, the second electronic device). Further, the plurality of credentials may be stored on the first electronic device and the second electronic device. The storage of credentials on both the electronic device may ensure credentials preservation and security in case of any electronic device system failure. Further, the storage of credentials at the cloud agent (such as, the first electronic device) may create direct access to the cloud agent. Direct access to the cloud agent may enable direct operation on the cloud system instead of access of the cloud system via the second electronic device. Further, according to the disclosure, external verifiers may verify the credentials directly from the EUCA of the first electronic device that belongs to same user.

FIG. 1 is a block diagram that illustrates an exemplary network environment for distributed identity (DID) based establishment of connection between electronic devices, in accordance with an embodiment of the disclosure. With reference to FIG. 1, there is shown a block diagram of a network environment 100. The network environment 100 may include a first electronic device 102, a second electronic device 104, a server 106, a database 112, a verifier node 108, an issuer node 116, and a distributed ledger 118. The first electronic device 102, the second electronic device 104, and the server 106 (and/or the database 112) may be interconnected through one or more networks, such as, the communication network 110. Further, the distributed ledger 118 may be connected with the verifier node 108, the issuer node 116, the first electronic device 102, and the second electronic device 104 (and in certain scenarios the server 106) through one or more networks, such as, the communication network 110. The database 112 may be configured to store credentials 114 corresponding to a set of credentials for authentication of a first user, wherein the first user may be a user who may own/operate or may be associated with the second electronic device 104. There is further shown an issuer node 116, and a verifier node 108, each being used for creation and verification of the set of credentials for authentication of the first user.

The first electronic device 102 may include suitable logic, circuitry, interfaces, and/or code that may be configured to transmit a request verification of credentials to the second electronic device 104. The first electronic device 102 may request verification with a requirement of a credentials (where the credentials may be issued by the issuer node 116). Further, the first electronic device 102 may be configured to create a first wallet account (for example, an account on a digital wallet application) of a first user associated with the second electronic device 104, based on a first credentials associated with the first user. The first electronic device 102 may include a verifier-end configured to verify credentials and a user-end configured to authenticate the first user based on the verified credentials. For example, as shown in FIG. 1, the first electronic device 102 may include an end-user cloud agent (EUCA) 102A and a verifier-end 102B. The verifier-end 102B may further include an issuer role 102C and a verifier role 102D. The first wallet account may be created at the verifier-end 102B of the first electronic device 102 and shared with the EUCA 102A of the first electronic device 102. Further, the first wallet account may be stored at the EUCA 102A of the first electronic device 102. The digital wallet may be a digital space to store personal data, assets, and information. In an example, the digital wallet may store user credentials associated with an account of the user and also secret keys for authentication of the user based on the stored user credentials. The network environment 100 may include at least one of the issuer node 116 associated with a credentials issuing authority, the verifier node 108 associated with the credentials verification authority, and the distributed ledger 118 associated with the credentials information of a user, such as, the first user. Based on the created first wallet account, the first electronic device 102 may generate a second credentials (that may correspond to the first credentials) associated with the first user.

In an embodiment, the first electronic device 102 may include the verifier-end 102B and the EUCA 102A, wherein the verifier-end 102B and the EUCA 102A may be part of separate electronic devices communicably coupled with each other. Further, the verifier-end 102B of the first electronic device 102 may illustrate at least two roles, such as the issuer role 102C and the verifier role 102D. Further, the issuer role 102C of the verifier-end 102B of the first electronic device 102 may be configured to generate the second credentials based on the creation of the first wallet account associated with the first user. Further, the verifier role 102D of the verifier-end 102B of the first electronic device 102 may be configured to verify the first credentials stored at the second electronic device 104. Further, the verifier role 102D of the verifier-end 102B of the first electronic device 102 may be configured to create a first wallet account based on the first credentials associated with the first user as the credentials issued by the issuer node 116 may be trusted by the verifier-end 102B of the first electronic device 102, since the issuer node 116 may have a pre-established trusted relationship with the verifier-end 102B. Furthermore, the EUCA 102A of the first electronic device 102 may be configured to store the created first wallet and store the second credentials generated by the issuer role 102C of the verifier end 102B.

In an embodiment, the first electronic device 102 may receive first notification information that may include a first verification status of the generated second credentials. The first verification status may be based on the verification of the stored second credentials corresponding to the stored first credentials. Further, the issuer role 102C of the verifier-end 102B of the first electronic device 102 may generate third credentials based on the first verification status of the generated second credentials received in the first notification information. In an embodiment, the third credentials may be generated by the issuer node 116. As the original issuer node 116 may be trusted by the external verifier (e.g., the verifier node 108), the trust on the third credentials may also be retained. For example, the first credentials and the second credentials may be associated with the decentralized identity (DID) of the first user. The DID of a node (e.g., the first electronic device 102 or second electronic device 104) may correspond to a unique identifier that may be used to verify a digital identity of the node using a decentralized approach. For example, the DID may include a unique machine ID of the node and a global or a local timestamp associated with the node. In an embodiment, the verification of an entity (e.g., a first node) of the network environment 100 through a DID of the entity may enable the entity to have a greater control over sensitive identification information of the entity. Based on the DID of the entity, the entity may be authenticated using a decentralized application of cryptographic techniques on the digital identity of the entity, without the requirement of a centralized controller The first electronic device 102 may receive second notification information including a second verification status of the generated third credentials. Based on the received second notification information, the first electronic device 102 may store the generated third credentials. The second verification status may be based on the verification of the generated third credentials corresponding to the stored first credentials and/ or second credentials. For example, the first credentials, the second credentials, and the third credentials may be associated to the DID of the first user. In an embodiment, the first wallet account may be created based on the first credentials associated with the first user as the credentials issued by the issuer node 116 may be trusted by the verifier-end 102B of the first electronic device 102, since the issuer node 116 may have a pre-established trusted relationship with the verifier-end. In an embodiment, the stored third credentials may be used by the second electronic device 104 to establish a connection between the first electronic device 102 and the second electronic device 104. In an embodiment, the first electronic device 102 may correspond to a cloud agent of a network, such as, the communication network 110. Examples of the first electronic device 102 may include, but are not limited to, a computing device, a smartphone, a cellular phone, a mobile phone, a gaming device, a mainframe machine, a server, a computer workstation, an end-user cloud agent (EUCA) (enabled with or hosting, for example, a computing resource, a memory resource, and a networking resource), and/or a consumer electronic (CE) device. In an embodiment, the first electronic device 102 may include the verifier-end 102B along with the EUCA 102A. Herein, in another embodiment the verifier-end 102B and the EUCA 102A may be part of separate electronic devices communicably coupled with each other.

The second electronic device 104 may include suitable logic, circuitry, interfaces, and/or code that may be configured to establish connection with the issuer node 116 for issuance of the first credentials. Further, the second electronic device 104 may be configured to request the first credentials from the issuer node 116. Further, the second electronic device 104 may be configured to receive the first credentials, based on a request for issuance of the first credentials. Further, upon receipt of the first credentials, the second electronic device 104 may store the first credentials.

In an embodiment, the second electronic device 104 may be configured to transmit a connection request to the first electronic device 102 for establishment of a connection. Further, the second electronic device 104 may be configured to verify the first credentials and transmit a verification status of the first credentials to the first electronic device 102. Based on the verification status of the first credentials, the first electronic device 102 may create and store the second credentials. Further, the second electronic device 104 may be configured to receive third notification information including a wallet identifier and a wallet key, based on the generated second credentials associated with the first user. The third notification information may be received by a DID messaging system. Further, the second electronic device 104 may be configured to transmit the received third notification information to the issuer node 116 using the DID messaging system. The first electronic device 102 may be configured to transmit the third notification to the second electronic device 104 such that the second electronic device 104 may access the first wallet account created at the first electronic device 102. Upon reception of the third notification, the second electronic device 104 may be configured to request connection details from the first electronic device 102. Further, the second electronic device 104 may be configured to receive the connection details from the first electronic device 102, based on the connection details request.

In an embodiment, the second electronic device 104 may transmit a connection request to the verifier node 108, based on the received connection details from the EUCA 102A of the first electronic device 102. Further, the second electronic device 104 may transmit connection details to the EUCA 102A of the first electronic device 102, based on the verified first credentials. For example, the first credentials and the second credentials may be associated to the decentralized identity (DID) of the first user. The DID of a node (e.g., the first electronic device 102 or second electronic device 104) may correspond to a unique identifier that may be used to verify a digital identity of the node using a decentralized approach. For example, the DID may include a unique machine ID of the node and a global or a local timestamp associated with the node. In an embodiment, the verification of an entity (e.g., the first node) of the network environment 100 through a DID of the entity may enable the entity to have a greater control over sensitive identification information of the entity. Based on the DID of the entity, the entity may be authenticated using a decentralized application of cryptographic techniques on the digital identity of the entity, without the requirement of a central controller.

For example, the second electronic device 104 may include an Application Programming Interface (API) node and the DID node. Further, the API node of the second electronic device 104 may be configured to receive a first user input (such as, a QR code) and information associated with a first user device (such as, the second electronic device 104). The information associated with the first user device may include a type of device, a type of connection, and the like. In an embodiment, the second electronic device 104 may correspond to a user agent of a network, such as, the communication network 110. Examples of the second electronic device 104 may include, but are not limited to, a computing device, a smartphone, a cellular phone, a mobile phone, a gaming device, a mainframe machine, a server, a computer workstation, an edge agent, an end user mobile agent (enabled with or hosting, for example, a computing resource, a memory resource, and a networking resource), and/or a consumer electronic (CE) device.

The server 106 may include suitable logic, circuitry, and interfaces, and/or code that may be configured to receive credentials 114 (such as, the first credentials, the second credentials and/or the third credentials) associated with a user. Further, the server 106 may be configured to store the credentials 114. The server 106 may be configured to verify the stored the first credentials, the second credentials and/or the third credentials. The server 106 may verify that the first credentials corresponds to each of the second credentials and the third credentials to establish a credentials synchronization between the first electronic device 102 and the second electronic device 104. Further, the server 106 may create a first wallet account associated with the second electronic device 104, based on the first credentials. The created first wallet account associated with the first user may be configured based on the verified first credentials.

The server 106 may be implemented as a cloud server and may execute operations through web applications, cloud applications, HTTP requests, repository operations, file transfer, and the like. Other example implementations of the server 106 may include, but are not limited to, a database server, a file server, a web server, a media server, an application server, a mainframe server, a machine learning server (enabled with or hosting, for example, a computing resource, a memory resource, and a networking resource), or a cloud computing server.

In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to the implementation of the server 106, the first electronic device 102, the second electronic device 104, as separate entities. In certain embodiments, the functionalities of the server 106 can be incorporated in its entirety or at least partially in the first electronic device 102 and/or the second electronic device 104 without a departure from the scope of the disclosure. In certain embodiments, the server 106 may host the database 112. Alternatively, the server 106 may be separate from the database 112 and may be communicatively coupled to the database 112.

The verifier node 108 may include suitable logic, circuitry, and interfaces, and/or code that may be configured to receive a credentials verification request associated with a first node (of the first electronic device 102 or the second electronic device 104). Further, the verifier node 108 may query a holder node (such as, a holder node associated with first electronic device 102 or the second electronic device 104) for verified credentials of the first node, based on the received credentials verification request. Further, the verifier node 108 may receive, from the holder node, the verified credentials of the first node, based on the query. The DID of the first node may be verified based on the received verified credentials of the first node. Once the verification is completed, the second credentials and/or third credentials may be stored at the second electronic device 104. In an example, the verifier node 108 may be associated with a governing organization or administrator associated with the issuer node 116. In an embodiment, the verifier node 108 may be an external verifier node corresponding to an electronic device other than the first electronic device 102.

In an embodiment, the verifier node 108 may be associated with the first electronic device 102 or the second electronic device 104. Further, the verifier node 108 may be configured to receive a credentials verification request (e.g., a credentials verification request 524) associated with the first electronic device 102, based on the received connection request of the second electronic device 104. For example, based on the received connection request including the first credentials, the verifier node 108 may trigger (for example, an event associated with a credentials verification request 524) automatic transmission of a request for credentials to the first electronic device 102. In certain scenarios, the verifier node 108 may trigger an event (associated with the credentials verification request 524) for the verification of the third credentials. Based on the triggered event, the verifier node may verify the third credentials associated with the first user. Further, the verifier node 108 may be configured to transmit the verification result including the verification status of the third credentials to the first electronic device 102, based on the verification of the third credentials.

The communication network 110 may include a communication medium through which the first electronic device 102, the second electronic device 104, the distributed ledger 118, and the server 106 may communicate with one another. The communication network 110 may be one of a wired connection or a wireless connection. Examples of the communication network 110 may include, but are not limited to, the Internet, a cloud network, Cellular or Wireless Mobile Network (such as Long-Term Evolution and $5^{th}$ Generation (5G) New Radio (NR)), satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The database 112 may include suitable logic, interfaces, and/or code that may be configured to store the credentials 114 (such as, the first credentials, the second credentials, and/or the third credentials) associated with the first user (for example, a user of the second electronic device 104). The database 112 may be derived from data off a relational or non-relational database, or a set of comma-separated values (csv) files in conventional or big-data storage. The database 112 may be stored or cached on a device, such as a server (e.g., the server 106) or the first electronic device 102 or the second electronic device 104. The device storing the database 112 may be configured to receive first notification information including a first verification status of the generated second credentials from the first electronic device 102 or the second electronic device 104 or the server 106. In response, the device of the database 112 may be configured to generate a third credentials associated with the first user, based on the first verification status of the generated second credentials. Further, the storing the database 112 may be configured to receive second notification information including a second verification status of the generated third credentials. In response, the device of the database 112 may be configured to store the generated third credentials on the first electronic device 102 or the second electronic device 104, based on the second verification status of the generated third credentials. Based on the validity of the credentials of the second electronic device 104, the second electronic device 104 may establish connection with the first electronic device 102.

In some embodiments, the database 112 may be hosted on a plurality of servers stored at the same or different locations. The operations of the database 112 may be executed using hardware including a processor, a microprocessor (e.g., to perform or control performance of one or more operations), a field-programmable gate array (FPGA), or an application-specific integrated circuit (ASIC). In some other instances, the database 112 may be implemented using software.

The issuer node 116 may include suitable logic, circuitry, and interfaces, and/or code that may be configured to generate the first credentials associated with first electronic device 102 or the second electronic device 104. The generated credentials may correspond to a set of attributes including at least one of an organization name, an organization ID, a name and electronic-mail ID of an administrator user, a role of a user of a node, or a user privilege level associated with a user of a node. The issuer node 116 may be associated with a government organization or a private organization. Herein, the issuer node 116 may be associated with a credentials issuing authority. Further, the issuer node 116 may define a credentials template. The credentials template may further include certain attributes, for example, ID of organization, organization name, admin username (such as, personnel associated with the organization), email address of admin, role, and responsibility of the admin. In an example, the issuer node 116 may manage a creation of digital identities of the first electronic device 102 or the second electronic device 104 and an authorization of the user, based on the credentials associated with the DID. For example, the issuer node 116 may be configured to establish connection with the second electronic device 104. Based on the established connection, the second electronic device 104 may request credentials generated at the issuer node 116. Furthermore, the issuer node 116 may be configured to transmit the generated first credentials to the second electronic device 104, based on the received credentials request. In an embodiment, the issuer node 116 may communicate with the issuer role 102C of the verifier-end 102B of the first electronic device 102 and transmit credentials generated by the issuer node 116 to the issuer role 102C of the verifier-end 102B of the first electronic device 102.

The distributed ledger 118 may be configured to store transaction records associated with the first user of the first electronic device 102 or the second electronic device 104. The distributed ledger 118 may correspond to a blockchain common database associated with the first user. In an embodiment, the distributed ledger 118 may be configured to store credentials (such as, the first credentials, the second credentials or the third credentials) associated with nodes (such as, the first electronic device 102 or the second electronic device 104) of the network environment 100. The stored credentials may be used for decentralized identification (DID) based verification or authentication of the nodes. The distributed ledger 118 may correspond to a decentralized identification (DID) blockchain database associated with the network environment 100. In an embodiment, each state object and/or credentials may correspond to a smart contract, a contract code (or rules of a transaction upon which parties to the transaction agree), and state properties (that may be updated when the transaction records and/or credentials information may be updated based on transaction messages from the publisher node and/or credentials creation by an issuer node). In an embodiment, the DID requires creation of a smart contract to build a ledger of a trust chain of the DID. The distributed ledger 118 may correspond to the built ledger of the trust chain (of the DID) that may require custom logic before data storage. By way of example, and not limitation, each of the distributed ledger 118 may be a Corda blockchain, an Ethereum blockchain, or a Hyperledger blockchain. For example, U.S. patent application Ser. No. 17/178,185 filed on Feb. 17, 2021, discloses details related to a distributed ledger database (such as, the distributed ledger 118).

In operation, the first electronic device 102 may be configured to create a first wallet account for a first user associated with the second electronic device 104, based on the first credentials associated with the first user. The first electronic device 102 may generate a second credentials associated with the first user, based on the creation of the first wallet account associated with the first user. The first electronic device 102 may receive first notification information including a first verification status of the generated second credentials. The first electronic device 102 may generate the third credentials associated with the first user, based on the first verification status of the generated second credentials. For example, the second credentials may be generated as a schema and may be associated with the first credentials issued by the issuer node 116. Further, the first electronic device may receive second notification information including the second verification status of the generated third credentials. Furthermore, the first electronic device may store the generated third credentials on the first electronic device 102, based on the second verification status of the generated third credentials. The second electronic device 104 may be configured to establish a connection with the first electronic device 102 using the stored third credentials. The connection establishment between first electronic device 102 and the second electronic device 104 in the network environment 100 is described further, for example, in FIGS. 2, 4A, 4B, 5A, 5B, and 5C.

Typically, a digital wallet is created such that the DID may be stored securely on the blockchain. The user may use the DID for any identity validation that ensures the security of the data stored in the digital wallet. Typically, for such a DID creation, there may be no streamlined process to establish connection between various entities. The connection establishment between various entities may be cumbersome and a time-consuming process that may require a mobile device for authentication. For example, authentication of the user may be performed by the mobile device. In such a case, the authentication process may be a network-oriented process. Further, during the authentication process, sensitive information (such as, name, email address, or organization name etc.) associated with the user, the organization, or the person associated with the organization may be available to the mobile device only. This may rise limitations concerns, such as, network connectivity and storage. In case the mobile device authenticating the user experiences a system failure, then the authentication process may be abrupted in middle of the authentication process. Thus, it may be desired to eliminate the limitation of authentication due to the mobile device.

On the contrary, the disclosed first electronic device 102 that may use the DID and associated the first electronic device 102 for various operations, such as creation of a wallet account, creation of plurality of credentials, verification of the plurality of credentials for authentication of a user. Further, the first electronic device 102 may synchronize a plurality of credentials to mirror the digital wallet account present in the first electronic device 102 or the second electronic device 104. The present disclosed first electronic device 102 may eliminate the limitation of network and storage, as the authentication may be performed on a cloud agent (such as, first electronic device) instead of the user device (such as, the second electronic device). Further, the plurality of credentials may be stored on the first electronic device and the second electronic device. The storage of credentials on both the electronic devices may ensure credentials preservation and security in case of any electronic device system failure. Further, the storage of credentials at the cloud agent (such as, the first electronic device) may create direct access to the cloud agent. Direct access to the cloud agent may enable direct operation on the cloud system instead of access of the cloud system via the second electronic device 104. Further, according to the disclosure, the external verifiers may verify the credentials directly from the EUCA 102A of the first electronic device 102 that may belong to same user.

Figure 2:
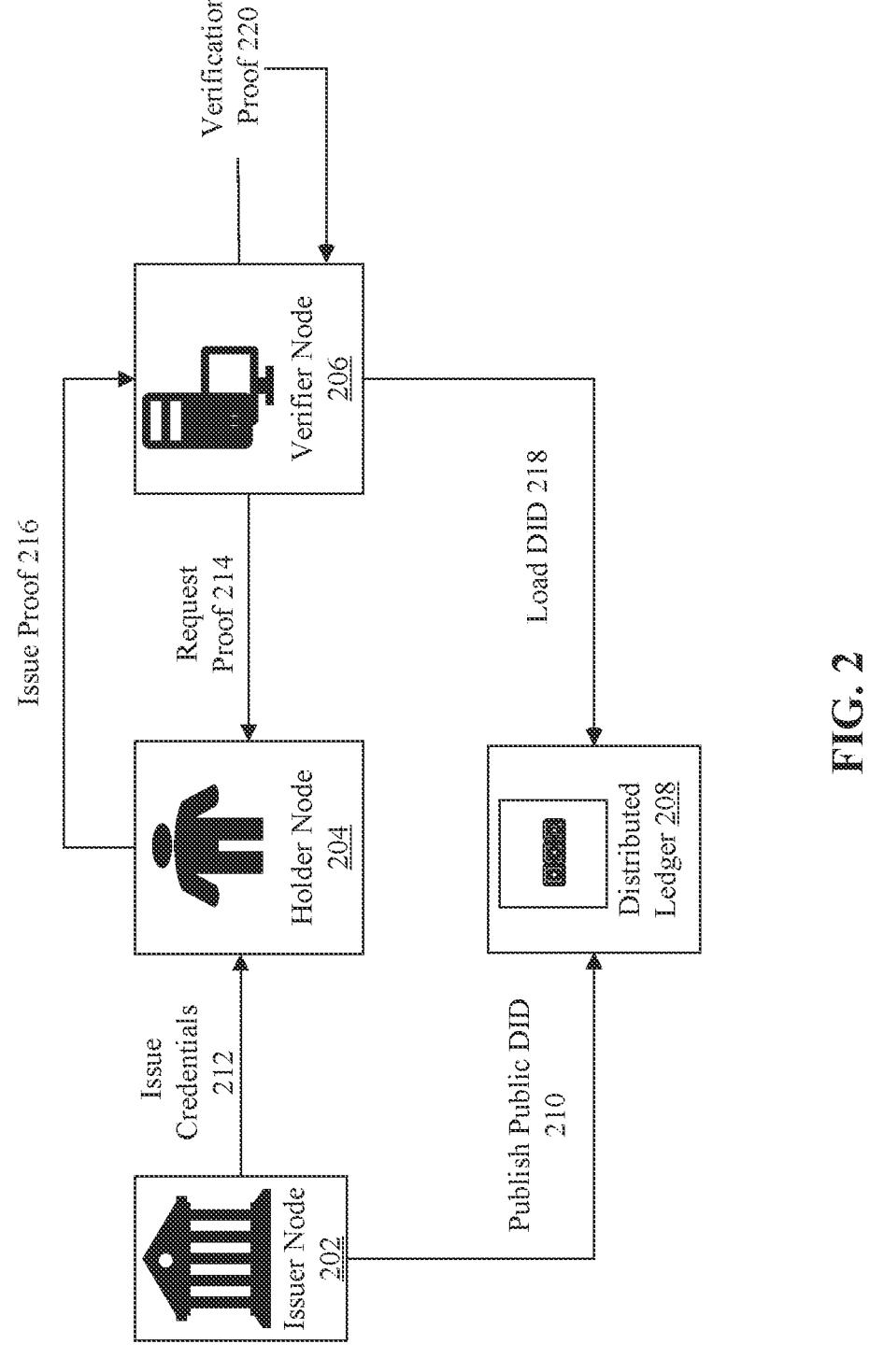
FIG. 2 is a diagram that illustrates an exemplary scenario for credentials request and verification of a first node for establishment of connection between nodes based on DID of the first node, in accordance with an embodiment of the disclosure.

FIG. 2 is a diagram that illustrates an exemplary scenario for credentials request and verification of a first node for establishment of connection between nodes based on DID of the first node, in accordance with an embodiment of the disclosure. FIG. 2 is explained in conjunction with elements from FIG. 1. With reference to FIG. 2, there is shown an exemplary scenario 200 for credentials request and verification of a first node for establishing connection between nodes based on DID of the first node. The scenario 200 may include an issuer node 202, a holder node 204, a verifier node 206, and a distributed ledger 208.

For example, a network (e.g., the communication network 110) may include a set of nodes including the first electronic device 102 and the second electronic device 104. Further, the network (e.g., the communication network 110) may further include at least one of an issuer node (e.g., the issuer node 202) associated with the credentials issuing authority, a set of holder nodes (e.g., a holder node 204) corresponding to the set of nodes of the network (e.g., the communication network 110), the verifier node 206 associated with the set of nodes of the network (e.g., the communication network 110), and a distributed ledger (e.g., the distributed ledger 208) associated with the network (e.g., the communication network 110). In an embodiment, each of the issuer node 202, the set of holder nodes (e.g., the holder node 204), and the verifier node 206 may be associated with the distributed ledger 208 and may include a corresponding distributed identity (DID) agent.

In an embodiment, the issuer node 202 may be configured to generate credentials associated with each holder node of the set of holder nodes. In an embodiment, the generated credentials may correspond to a set of attributes including at least one of: the organization name, the organization ID, the name and electronic-mail ID of the administrator user, the role of the user of the node, or the user privilege level associated with the user of the node. In an embodiment, the verifier node 206 may be configured to receive a credentials verification request associated with a first node from at least one of the first electronic device 102 or the second electronic device 104. Further, the verifier node 206 may be configured to query a holder node (e.g., the holder node 204) of the set of holder nodes for verified credentials of the first node, based on the received credentials verification request. Further, the verifier node 206 may be configured to receive, from the holder node, the verified credentials of the first node, based on the query. The DID of the first node may be verified based on the received verified credentials of the first node. A set of operations associated the scenario 200 is described herein.

The issuer node 202 may include suitable logic, circuitry, and interfaces, and/or code that may be configured to generate the credentials associated with a user of a node of the network environment 100. The generated credentials may correspond to a set of attributes including at least one of an organization name, an organization ID, a name and electronic-mail ID of an administrator user, a role of a user of a node, or a user privilege level associated with a user of a node. The issuer node 202 may be associated with a government organization or a private organization. The issuer node 202 may define a credentials template. The credentials template may further include certain attributes, for example, ID of organization, organization name, admin username (such as the personnel associated with the organization), email address of admin, role, and responsibility of the admin. In an example, the issuer node 202 may manage a creation of digital identities of the user and an authorization of the user, based on the credentials associated with the DID. Further, the issuer node 202 may be configured to establish connection with the holder node 204. Further, the issuer node 202 may be configured to issue credentials 212 associated with the holder node 204 and transmit the issued credentials 212 to the holder node 204, based on the established connection. Furthermore, the issuer node 202 may be configured to publish public DID 210 associated with the holder node 204 to the distributed ledger 208.

The holder node 204 may include suitable logic, circuitry, interfaces, and/or code that may be configured to establish connection with an issuer node 202 to request issuance of the credentials. Further, the holder node 204 may be configured to store the credentials issued (i.e., the issued credentials 212) by the issuer node 202. Further, the holder node 204 may be configured to receive a request proof 214 for the credentials issued by the issuer node 202. The request proof 214 may be received by the holder node 204 from the verifier node 206. Further, the holder node 204 may issue proof 216 of the stored credentials to the verifier node 206, upon receipt of the request proof 214 for the credentials. The proof of the stored credentials may be used to verify the credentials at the verifier node 206. Examples of the holder node 204 may include, but are not limited to, a computing device, a smartphone, a cellular phone, a mobile phone, a gaming device, a mainframe machine, a server, a computer workstation, an end user cloud agent (EUCA) (enabled with or hosting, for example, a computing resource, a memory resource, and a networking resource) with, and/or a consumer electronic (CE) device. For example, the stored credentials may be associated to the decentralized identity (DID) of the user. The DID of a node may correspond to a unique identifier that may be used to verify a digital identity of the node using a decentralized approach. For example, the DID may include a unique machine ID of the node and a global or a local timestamp associated with the node. In an embodiment, the verification of an entity (e.g., the first node) of the network environment 100, through the DID of the entity, may enable the entity to have a greater control over sensitive identification information of the entity. Based on the DID of the entity, the entity may be authenticated using a decentralized application of cryptographic techniques on the digital identity of the entity. Herein, the holder node 204 may correspond to one of the first electronic device 102 and the second electronic device 104.

The verifier node 206 may include suitable logic, circuitry, and interfaces, and/or code that may be configured to request proof 214 of the credentials issued (i.e., the issued credentials 212) by the issuer node 202 to the holder node 204. Further, the verifier node 206 may receive the issue proof 216 from the holder node 204, based on the request proof 214 of the credentials issued by the issuer node 202. Further, the verifier node 206 may receive a credentials verification request associated with a first node (of the first electronic device 102 or the second electronic device 104). Further, the verifier node 206 may query a holder node (such as, the holder node 204) for verified credentials of the user, based on the received credentials verification request. Further, the verifier node 206 may receive, from the holder node, the verified credentials of the first node, based on the query. The DID of the first node may be verified based on the received verified credentials of the first node. Further, the verifier node 206 may store the verified credentials as verification proof 220 and transmits the verified credentials to the distributed ledger 208. The verified credentials transmitted to the distributed ledger 208 may be included in an instruction to load DID 218. In an example, the verifier node 206 may be associated with a governing organization or administrator of the network environment 100.

The distributed ledger 208 may be configured to receive public DID 210 from the issuer node 202 and the instructions to load DID 218 from the verifier node 206. Further, the distributed ledger 208 may be configured store transaction records associated with the user. The distributed ledger 208 may correspond to a blockchain common database associated with the user. In an embodiment, the distributed ledger 208 may be configured to store credentials information associated with nodes of the network environment 100. The stored credentials information may be used for decentralized identification (DID) based verification or authentication of the nodes. The distributed ledger 208 may correspond to a decentralized identification (DID) blockchain database associated with network environment 100. Each state object and/or credentials information may correspond to a smart contract, a contract code (or rules of a transaction upon which parties to the transaction agree), and state properties (that may be updated when the transaction records and/or credentials information may be updated based on transaction messages from the publisher node and/or credentials creation by an issuer node). By way of example, and not limitation, each of the distributed ledger 208 may be a Corda blockchain, an Ethereum blockchain, or a Hyperledger blockchain. For example, U.S. patent application Ser. No. 17/178,185 filed on Feb. 17, 2021, discloses details related to a distributed ledger database (such as, the distributed ledger 118).

In an embodiment, a system for General Data Protection Regulation (GDPR) compliant user authentication may be used for authentication of nodes and users based on decentralized identifiers or distributed identifiers (DIDs) and self-sovereign identities (SSI). Sensitive information that may be required to be protected for GDPR compliance may be stored as credentials information in a decentralized identification (DID) blockchain database. In an example, the decentralized identification (DID) blockchain database may be implemented as the distributed ledger 208.

Figure 3A:
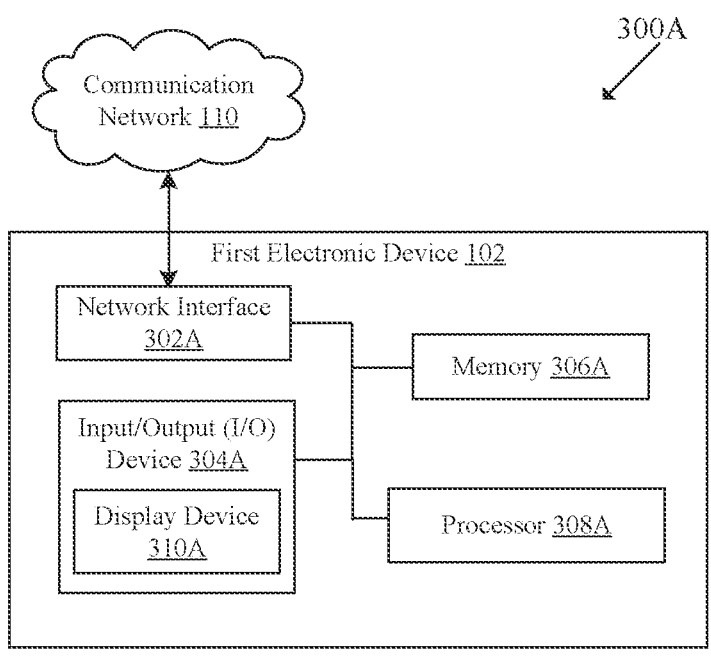
FIG. 3A is a block diagram that illustrates an exemplary first electronic device of FIG. 1, in accordance with an embodiment of the disclosure.

FIG. 3A is a block diagram that illustrates an exemplary first electronic device of FIG. 1, in accordance with an embodiment of the disclosure. FIG. 3A is explained in conjunction with elements from FIG. 1. With reference to FIG. 3A, there is shown the exemplary first electronic device 102. The first electronic device 102 may include a network interface 302A, an input/output (I/O) device 304A, a memory 306A, and a processor 308A. The memory 306A may store the credentials 114. The input/output (I/O) device 304A may include a display device 310A.

The network interface 302A may include suitable logic, circuitry, interfaces, and/or code that may be configured to facilitate communication between the first electronic device 102, the second electronic device 104, and the server 106, via the communication network 110. The network interface 302A may be implemented by use of various known technologies to support wired or wireless communication of the first electronic device 102 with the communication network 110. The network interface 302A may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 302A may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The I/O device 304A may include suitable logic, circuitry, interfaces, and/or code that may be configured to receive an input and provide an output based on the received input. For example, the I/O device 304A may receive the first credentials to create the first wallet account for the first user associated with the second electronic device 104. The I/O device 304A may be further configured to display or render information associated with the created first wallet account to generate the second credentials associated with the first user. The I/O device 304A may include the display device 310A. Examples of the I/O device 304A may include, but are not limited to, a display (e.g., a touch screen), a keyboard, a mouse, a joystick, a microphone, or a speaker. Examples of the I/O device 304a may further include braille I/O devices, such as, braille keyboards and braille readers.

The display device 310A may include suitable logic, circuitry, and interfaces that may be configured to render the information associated with the created first wallet and also render the first notification information to generate a third credentials associated with the first user. The display device 310A may be a touch screen which may enable a user to provide the user input via the display device 310A. The touch screen may be at least one of a resistive touch screen, a capacitive touch screen, or a thermal touch screen. The display device 310A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 310A may refer to a display screen of a head mounted device (HMD), a smart-glass device, a see-through display, a pro-jection-based display, an electro-chromic display, or a trans-parent display.

The memory 306A may include suitable logic, circuitry, interfaces, and/or code that may be configured to store one or more instructions to be executed by the processor 308A. The one or more instructions stored in the memory 306A may be configured to execute the different operations of the processor 308A (and/or the first electronic device 102). The memory 306A may be further configured to store the cre-dentials 114, such as, the first credentials, the second cre-dentials, and/or the third credentials. Examples of imple-mentation of the memory 306A may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The processor 308A may include suitable logic, circuitry, and/or interfaces that may be configured to execute program instructions associated with different operations to be executed by the first electronic device 102. The operations may include the reception of first notification information to generate second credentials, reception of second notification information to generate third credentials, reception of third notification information to establish connection with the second electronic device 104, and reception of fourth noti-fication information to establish connection with the verifier node 108. The processor 308A may include one or more processing units, which may be implemented as a separate processor. In an embodiment, the one or more processing units may be implemented as an integrated processor or a cluster of processors that perform the functions of the one or more specialized processing units, collectively. The proces-sor 308A may be implemented based on a number of processor technologies known in the art. Examples of imple-mentations of the processor 308A may be an X86-based processor, a Graphics Processing Unit (GPU), a Reduced Instruction Set Computing (RISC) processor, an Applica-tion-Specific Integrated Circuit (ASIC) processor, a Com-plex Instruction Set Computing (CISC) processor, a micro-controller, a central processing unit (CPU), and/or other control circuits. Various operations of the processor 308A synchronize the verified first credentials, verified second credentials and the verified third credentials are described further, for example, in FIGS. 4A and 4B.

Figure 3B:
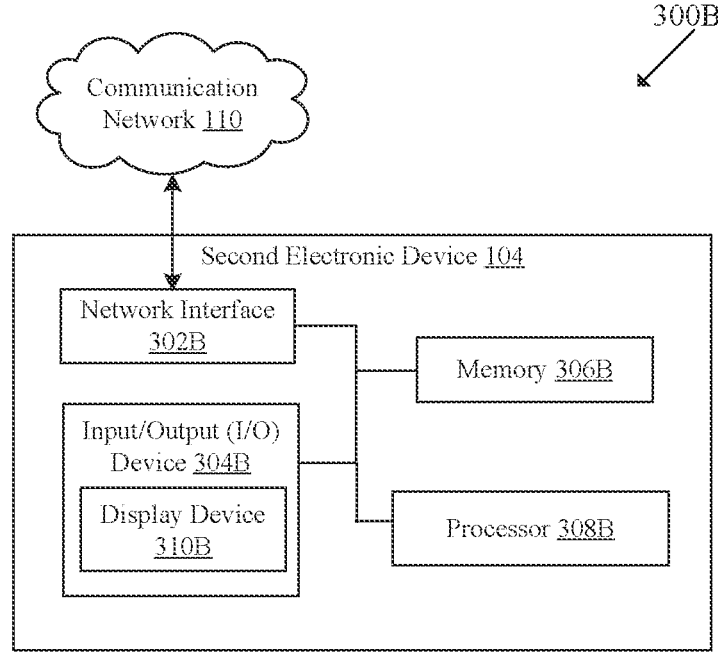
FIG. 3B is a block diagram that illustrates an exemplary second electronic device of FIG. 1, in accordance with an embodiment of the disclosure.

FIG. 3B is a block diagram that illustrates an exemplary second electronic device of FIG. 1, in accordance with an embodiment of the disclosure. FIG. 3B is explained in conjunction with elements from FIG. 1. With reference to FIG. 3B, there is shown the exemplary second electronic device 104 including a network interface 302B, an input/output (I/O) device 304B, a memory 306B, and a processor 308B. The memory 306B may store the credentials 114. The input/output (I/O) device 304B may include a display device 310B.

The network interface 302B may include suitable logic, circuitry, interfaces, and/or code that may be configured to facilitate communication between the second electronic device 104, the first electronic device 102, and the server 106, via the communication network 110. The network interface 302B may be implemented by use of various known technologies to support wired or wireless commu-nication of the second electronic device 104 with the com-munication network 110. The network interface 302B may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 302B may be configured to com-municate via wireless communication with networks, such as the Internet, an Intranet, a wireless network, a cellular telephone network, a wireless local area network (LAN), or a metropolitan area network (MAN). The wireless commu-nication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The I/O device 304B may include suitable logic, circuitry, interfaces, and/or code that may be configured to receive an input and provide an output based on the received input. For example, the I/O device 304B may receive the first creden-tials to create the first wallet account for the first user associated with the second electronic device 104. The I/O device 304B may be further configured to display or render the information associated with the created first wallet account to generate the second credentials associated with the first user. The I/O device 304B may include the display device 310B. Examples of the I/O device 304B may include, but are not limited to, a display (e.g., a touch screen), a keyboard, a mouse, a joystick, a microphone, or a speaker. Examples of the I/O device 304B may further include braille I/O devices, such as, braille keyboards and braille readers.

The display device 310B may include suitable logic, circuitry, and interfaces that may be configured to display information associated with the created first wallet account and also display the received verification request associated with the first electronic device 102. Further, the display device 310B may display the verification status of the first credentials upon verification. The display device 310B may be a touch screen which may enable a user to provide the user input via the display device 310B. The touch screen may be at least one of a resistive touch screen, a capacitive touch screen, or a thermal touch screen. The display device 310B may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 310B may refer to a display screen of a head mounted device (HMD), a smart-glass device, a see-through display, a projection-based display, an electro-chromic display, or a transparent display.

The memory 306B may include suitable logic, circuitry, interfaces, and/or code that may be configured to store one or more instructions to be executed by the processor 308B. The one or more instructions stored in the memory 306B may be configured to execute the different operations of the processor 308B (and/or the second electronic device 104). The memory 306B may be further configured to store the first credentials issued by the issuer node 116. Examples of implementation of the memory 306B may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The processor 308B may include suitable logic, circuitry, and/or interfaces that may be configured to execute program instructions associated with different operations to be executed by the second electronic device 104. The operations may include the verification request reception from the first electronic device 102. The processor 308B may verify the first credentials and transmit the verification status of the first credentials to the first electronic device 102. Further, the processor 308B may receive the third notification information that includes the wallet identifier and the wallet key. The third notification information may be transmitted by the DID messaging system. The processor 308B may include one or more processing units, which may be implemented as a separate processor. In an embodiment, the one or more processing units may be implemented as an integrated processor or a cluster of processors that perform the functions of the one or more specialized processing units, collectively. The processor 308B may be implemented based on a number of processor technologies known in the art. Examples of implementations of the processor 308B may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits. Various operations of the processor 308B for implementation of creation and verification of the first credentials, the second credentials and/or the third credentials are described further, for example, in FIGS. 4A and 4B.

Figure 4A:
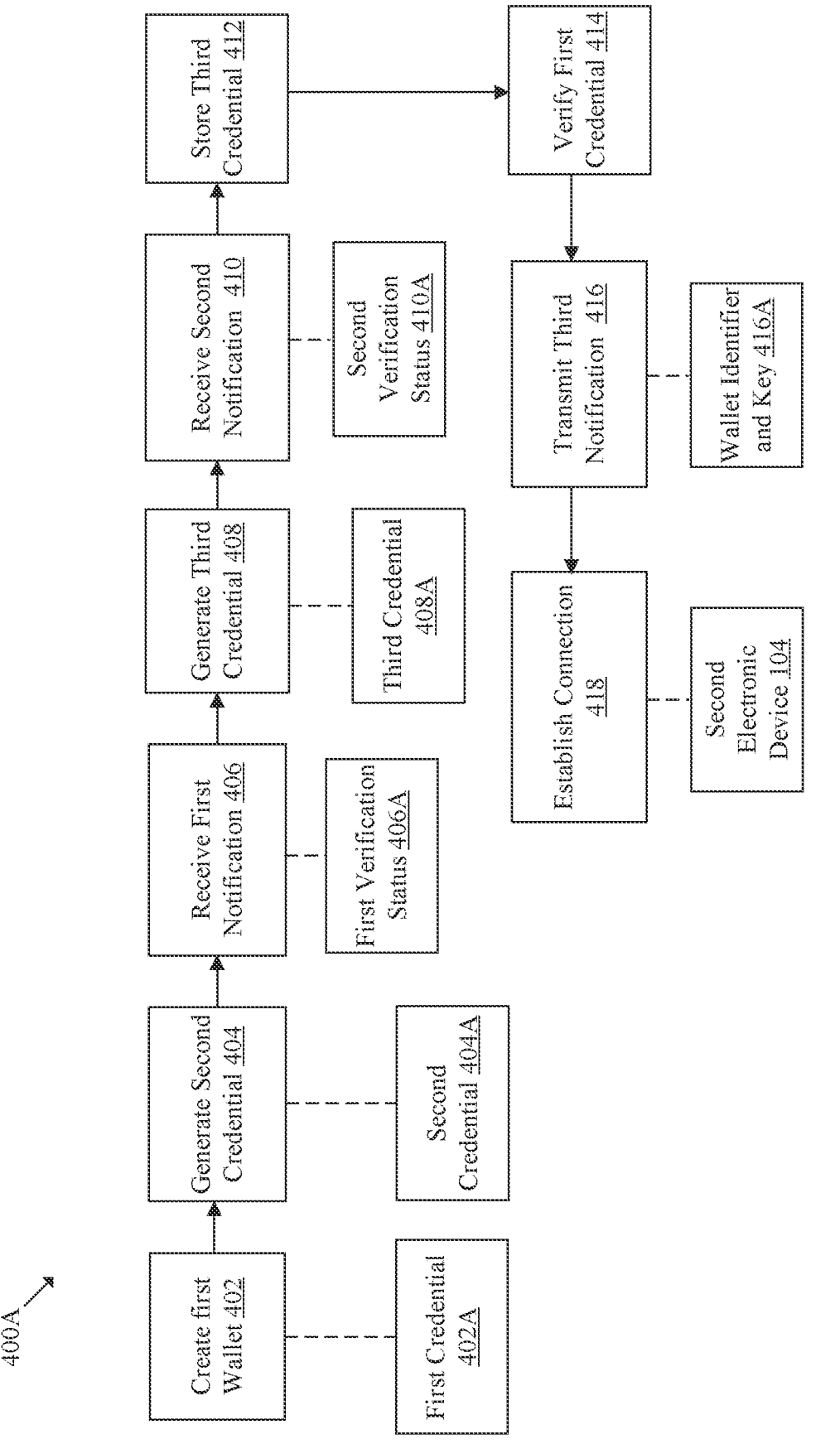
FIGS. 4A and 4B illustrate exemplary processing pipelines for establishment of connection between electronic devices based on authentication of plurality of credentials of a user, in accordance with an embodiment of the disclosure.
Figure 4B:
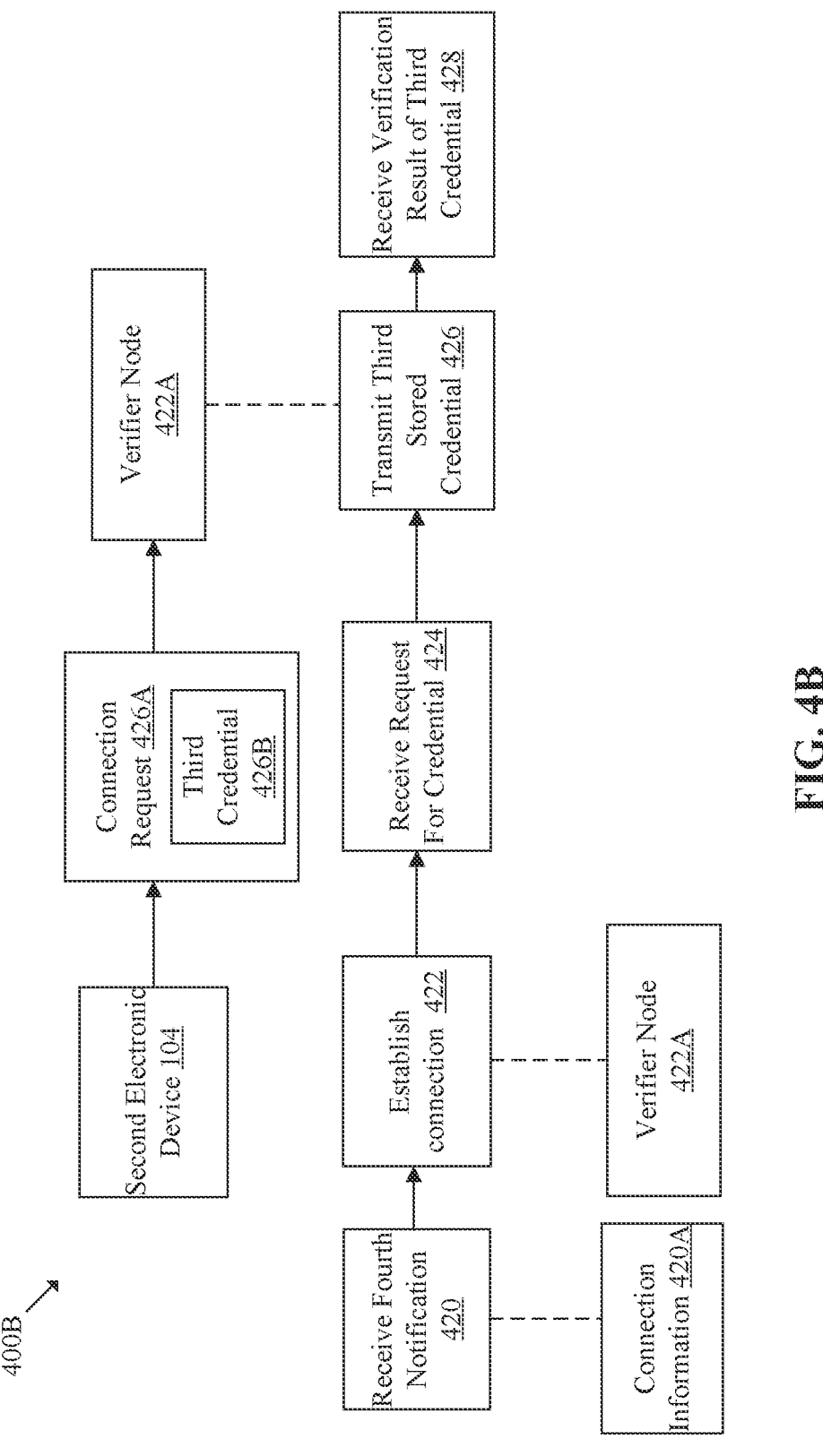

FIGS. 4A and 4B illustrate exemplary processing pipelines for establishment of connection between electronic devices based on authentication of plurality of credentials of a user, in accordance with an embodiment of the disclosure. FIGS. 4A and 4B are explained in conjunction with elements from FIG. 1, FIG. 2, FIG. 3A, and FIG. 3B. With reference to FIG. 4A, there is shown an exemplary processing pipeline 400A that illustrates exemplary operations from 402 to 418 for implementation of DID based establishment of connection between the first electronic device 102 and the second electronic device 104. The exemplary operations 402 to 418 may be executed by any computing system, for example, by the first electronic device 102 or the second electronic device 104 of FIG. 1 or by the processor 308A of FIG. 3A or by the processor 308B of FIG. 3B. In FIG. 4A, there is further shown, a first credentials 402A, a second credentials 404A, a first verification status 406A, a third credentials 408A, a second verification status 410A, and a wallet identifier and wallet key 416A. The operations 402 to 418 are described herein next.

At 402, an operation to create the first wallet account may be executed. The processor 308A may be configured to create the first wallet account for a first user associated with the second electronic device 104, wherein the first wallet account may be created by the verifier role 102D of the verifier-end 102B of the first electronic device 102. In an embodiment, the first electronic device 102 may include the verifier-end 102B along with the EUCA 102A. Herein, in another embodiment the verifier-end 102B and the EUCA 102A may be part of separate electronic devices communicably coupled with each other. The first wallet account may be created based on a first credentials (e.g., the first credentials 402A) associated with the first user. The first credentials 402A associated with the first user may be issued by the issuer node 116 (and received by the processor 308A) based on a request of issuance of a credentials from the first electronic device 102. Examples of the issued first credentials 402A, may include, but are not limited to, certain attributes, for example, ID of organization, organization name, admin username (such as the personnel associated with the organization), email address of admin, role, and responsibility of the admin. Also, for example, the created first wallet account, may include, but is not limited to, gift cards, debit card details, credit card details, membership card, loyalty card, coupons, tickets, license, ID card, and access keys.

In an embodiment, the first wallet account may be created based on the first credentials 402A associated with the first user as the credentials issued by the issuer node 116 may be trusted by the verifier-end 102B of the first electronic device 102, since the issuer node 116 may have a pre-established trusted relationship with the verifier-end Further, the first wallet account may be created by leveraging DID verification operations.

In an embodiment, the first credentials 402A may correspond to a set of attributes including at least one of an organization name, an organization ID, a name and electronic-mail ID of an administrator user, a role of a user of a node, or a user privilege level associated with the user. Further, the created first wallet account may correspond to a digital space to store personal data, assets, and information. It may be appreciated that the first credentials 402A may be associated with the created first wallet account. The first wallet account may allow the user to manage and access the first credentials 402A. The first credentials 402A issued by the issuer node 116 may be stored at the first electronic device 102 or the second electronic device 104. Thus, a decentralized control of the first credentials 402A may be available for a user. Herein, the user may be able to control when, what, where, and how long the first credentials may be shared with the first electronic device 102 or the second electronic device 104. The created first wallet account associated with the first user may be configured based on the verified first credentials.

In order to obtain the first credentials 402A associated with the first user, the second electronic device 104 may establish connection with the issuer node 116. Further, the second electronic device 104 may request the issuer node 116 to create the first credentials 402A. Further, the issuer node 116 may create and transmit the first credentials 402A associated with the first user. Further, the second electronic device 104 may receive the first credentials 402A, based on the request made. Thereafter, the first credentials 402A associated with the first user may verified by the second electronic device 104. In an embodiment, the first electronic device 102 may include the verifier-end 102B along with the EUCA 102A. Herein, in another embodiment the verifier-end 102B and the EUCA 102A may be part of separate electronic devices communicably coupled with each other. Further, the verified first credentials 402A may be shared with the first electronic device 102 for creation of the first wallet account. The first wallet account associated with the first user may be created on the verifier-end 102B of the first electronic device 102. Further, the created first wallet account may be shared with the EUCA 102A of the first electronic device 102.

At 404, an operation to generate the second credentials may be executed. The processor 308A may be configured to generate a second credentials (e.g., the second credentials 404A) associated with the first user, based on the creation of the first wallet account associated with the first user. The processor 308A may be configured to receive the first wallet account associated with the first user. The first wallet account may be created on the verifier-end 102B of the first electronic device 102, based on reception of the first credentials 402A associated with the first user. Examples of the generated second credentials 404A, may include, but are not limited to, certain attributes, for example, ID of organization, organization name, admin username (such as the personnel associated with the organization), email address of admin, role, and responsibility of the admin.

In an embodiment, the second credentials 404A may correspond to a set of attributes including at least one of an organization name, an organization ID, a name and electronic-mail ID of an administrator user, a role of a user of a node, or a user privilege level associated with the user. It may be appreciated that the generated second credentials 404A may correspond to the verified first credentials 402A to establish credentials synchronization between the first electronic device 102 and the second electronic device 104. Further, the second credentials 404A may also be associated with the created first wallet account. The first wallet account may allow the user to manage and access the first credentials and/or the second credentials. The generated second credentials 404A may be stored at the EUCA 102A of the first electronic device 102. Thus, a decentralized control of the second credentials 404A may be available for a user. Herein, the user may be able to control when, what, where, and how long the second credentials 404A may be shared with the first electronic device 102 or the second electronic device 104.

The verifier-end 102B of the first electronic device 102 may generate the second credentials 404A, upon reception of the verified first credentials 402A and creation of the first wallet account. For example, the second credentials 404A may be partly associated with the first credentials 402A. Herein, the second credentials 404A may include a partial set of attributes. For example, the first credentials 402A may include various details such as name, ID number, age, account details, etc. of the first user further, the second credentials may include only one detail of the user such as, ID number. Thus, the second credentials 404A may provide a higher level of security to the data and/or the first wallet account associated with the first user.

At 406, an operation for reception of the first notification information may be executed. The processor 308A may be configured to receive the first notification information including a first verification status (e.g., the first verification status 406A) of the generated second credentials 404A

(generated at 404). The first verification status 406A may correspond to verification of the second credentials 404A by the second electronic device 104, based on the verified first credentials 402A.

In an embodiment, the EUCA 102A of the first electronic device 102 may be configured to establish a connection with the issuer node 116. Further, the issuer node 116 may be configured to receive a request for a verification status of the second credentials from the EUCA 102A of the first electronic device 102. Further, the issuer node 116 may be configured to verify the second credentials, based on the verified first credentials 402A. Further, the issuer node 116 may generate the first notification information based on an inclusion of the verification status of the second credentials in the first notification information. Further, the issuer node 116 may be configured to transmit the generated first notification information to EUCA 102A of the first electronic device 102. The EUCA 102A of the first electronic device 102 may be receive the first notification information transmitted by the issuer node 116.

At 408, an operation to generate the third credentials may be executed. The processor 308A may be configured to generate the third credentials 408A associated with the first user, based on the first verification status 406A of the generated second credentials 404A. Based on the receipt of the first notification information associated with the verified second credentials 404A of the first user, the third credentials 408A may be generated. Further, the EUCA 102A of the first electronic device 102 may be configured to receive a request for verification of the second credentials from the issuer node 116. Thereafter, the EUCA 102A of the first electronic device 102 may be configured to create the first notification information, based on reception of the verification request. Further, the EUCA 102A of the first electronic device 102 may share the first notification information with the issuer node 116. Thereafter, the issuer node 116 may be configured to generate the third credentials associated with the first user, based on the first notification information. Examples of the generated third credentials 408A, may include, but are not limited to, certain attributes, for example, ID of organization, organization name, admin username (such as the personnel associated with the organization), email address of admin, role, and responsibility of the admin. Further, the EUCA 102A of the first electronic device 102 may be configured to receive the generated third credentials 408A.

In an embodiment, the third credentials 408A may correspond to a set of attributes including at least one of an organization name, an organization ID, a name and electronic-mail ID of an administrator user, a role of a user of a node, or a user privilege level associated with the user. It may be appreciated that the generated third credentials 408A may correspond to the verified first credentials 402A to establish credentials synchronization between the first electronic device 102 and the second electronic device 104. Further, the third credentials 408A may also be associated with the created first wallet account. The first wallet account may allow a user to manage and access the first credentials 402A and/or the second credentials 404A.

The issuer role 102C of the verifier-end 102B of the first electronic device 102 may generate the third credentials 408A, upon reception of the verified first credentials 402A, creation of the first wallet account, the generation of the second credentials 404A, and the receipt of the first notification information (including the first verification status 406A). For example, the third credentials 408A may be partly associated with the first credentials 402A and also the second credentials 404A. Herein, the third credentials 408A may include a partial set of attributes. Thereafter, the third credentials 408A may provide higher level of security to the data and/or the first wallet account associated with the first user. The generated third credentials 408A may be stored at the EUCA 102A of the first electronic device 102. Thus, a decentralized control of the third credentials 408A may be available for a user. Herein, the user may be able to control when, what, where, and how long the third credentials 408A may be shared with the first electronic device 102 or the second electronic device 104.

At 410, an operation for reception of the second notification information may be executed. The processor 308A may be configured to receive the second notification information including the second verification status 410A of the generated third credentials 408A (generated at, 408). The second verification status 410A may correspond to verification of the third credentials 408A by the second electronic device 104, based on the verified second credentials 404A.

In an embodiment, the EUCA 102A of the first electronic device 102 may be configured to establish a connection with the issuer node 116. Further, the EUCA 102A of the first electronic device 102 may request a verification status of the third credentials 408A from the verifier node 108. In an embodiment, the third credentials 408A may be verified, based on the verification of the second credentials 404A. Further, the verification status of the third credentials 408A may be encapsulated in the second notification information. Further, the verifier node 108 may be configured to transmit the second notification information to the EUCA 102A of the first electronic device 102.

At 412, an operation to store the third credentials may be executed. The processor 308A may be configured to store the generated third credentials 408A on the first electronic device 102 (e.g., in the memory 306A), based on the second verification status 410A of the generated third credentials 408A The processor 308A may receive the created third credentials from the issuer node 116. Further, processor 308A may be configured to receive the second notification information associated with the verified third credentials 408A of the first user. Thereafter, the EUCA 102A of the first electronic device 102 may be configured to store the verified third credentials, based on the received second notification information. The third credentials 408A may also be associated with the created first wallet account. The first wallet account may allow the user to manage and access the first credentials and/or the second credentials. Furthermore, the first credentials 402A, the second credentials 404A, and the third credentials 408A may include the same license key.

At 414, an operation to verify the first credentials may be executed. The processor 308A may be configured to receive the first credentials 402A from the second electronic device 104. Further, the processor 308A may be configured to retrieve/receive the stored third credentials 408A from a storage (e.g., the memory 306A) of the first electronic device 102. Further, the processor 308A may be configured to verify the first credentials 402A, based on the third credentials 408A. Further, processor 308A may be configured to store the verified first credentials 402A, based on the verification of the first credentials. Furthermore, the first credentials 402A, the second credentials 404A, and the third credentials 408A may include the same license key.

At 416, an operation for the third notification information transmission may be executed. The processor 308A may be configured to receive verified first credentials 402A. Further, the processor 308A may be configured to transmit third notification information to second electronic device 104, based on the verified second credentials 404A associated with the first user. Furthermore, the third notification information may include the wallet identification and wallet key 416A (such as, the license key).

At 418, an operation for connection establishment may be executed. The processor 308A may be configured to establish connection (such as, a DID-based connection) with the second electronic device 104, based on the transmitted third notification information form the first electronic device 102.

With reference to FIG. 4B, there is shown an exemplary processing pipeline 400B that illustrates exemplary operations from 420 to 428 for implementation of DID based establishment of connection between the first electronic device 102 and the second electronic device 104. The exemplary operations 420 to 428 may be executed by any computing system, for example, by the first electronic device 102 or the second electronic device 104 of FIG. 1 or by the processor 308A of FIG. 3A or by the processor 308B of FIG. 3B. In FIG. 4B, there is further shown, connection information 420A, a verifier node 422A, a connection request 426A, and a third credentials 426BA. The operations 420 to 428 are described herein next.

At 420, an operation for the fourth notification information reception may be executed. The processor 308A may be configured to receive the fourth notification information including connection information (e.g., the connection information 420A) of the first electronic device and the second electronic device, based on the first credentials and the transmitted first notification information. The connection information 420A may be associated with the created first wallet account and the stored second credentials 404A. The processor 308A may receive the connection information 420A included in the fourth notification information from the second electronic device 104. In an embodiment, prior to receipt of the fourth notification information from the second electronic device 104, the second electronic device 104 may send a connection request (e.g., based on a quick-response (QR) code or a Uniform Resource Identifier) associated with the second electronic device 104 to an external verifier node. In an example, the external verifier node may correspond to the verifier node 422A.

At 422, an operation for connection establishment may be executed. The processor 308A may be configured to establish connection with the verifier node 422A, based on the received fourth notification information. For example, based on the connection request associated with the second electronic device 104 received by the external verifier node (e.g., the verifier node 422A) and the fourth notification (which may include the connection information 420A), the processor 308A may establish the connection with the verifier node 422A.

At 424, an operation to request credentials reception may be executed. The processor 308A may be configured to receive a request for credentials from the verifier node 422A. The request for credentials may be received based on the connection established between the first electronic device 102 and the verifier node 422A. The request may include an instruction to transmit the first credentials, the second credentials, and/or the third credentials. the first credentials, the second credentials, and/or the third credentials may correspond to each other and may be usable interchangeably to verify authenticity of the second electronic device 104 and/or a user of the second electronic device 104.

At 426, an operation for transmission of the stored third credentials may be executed. The processor 308A may be configured to transmit the stored third credentials 408A to the verifier node 422A, based on the received request for credentials. The verifier node 422 may be configured to receive a connection request (e.g., the connection request 426A) from the second electronic device 104. Further, the connection request may correspond to the third credentials 426B. The processor 308A may be configured to receive the credentials request from the verifier node 422, based on the connection established between the first electronic device 102 and the verifier node 422A. Thereafter, the processor 308A may retrieve the stored third credentials 426B from the memory 306A based on the received credentials request. Further, the processor 308A may transmit the retrieved third credentials 426B to the verifier node 422, based on the received request for credentials.

At 428, an operation for reception of verification result of third credentials may be executed. The processor 308A may be configured to receive a verification result of the third credentials 426B, based on the connection request 426A from the second electronic device 104 and the transmitted third credentials 426B. On receipt of the connection request 426A from the second electronic device 104 and third credentials 426B from the first electronic device 102, the verifier node 422A may verify the third credentials 426B. For example, the verifier node 422A may verify the third credentials 426B based on a distributed identity (DID)-based verification technique. Based on the verification of the third credentials 426B, the processor 308A may be configured to generate a verification result of the third credentials 426B and transmit the verification result of the third credentials to the first electronic device 102. The processor 308B of the second electronic device 104 may be configured to establish connection with the first electronic device 102, based on the received verification result (by the first electronic device 102).

Figure 5A:
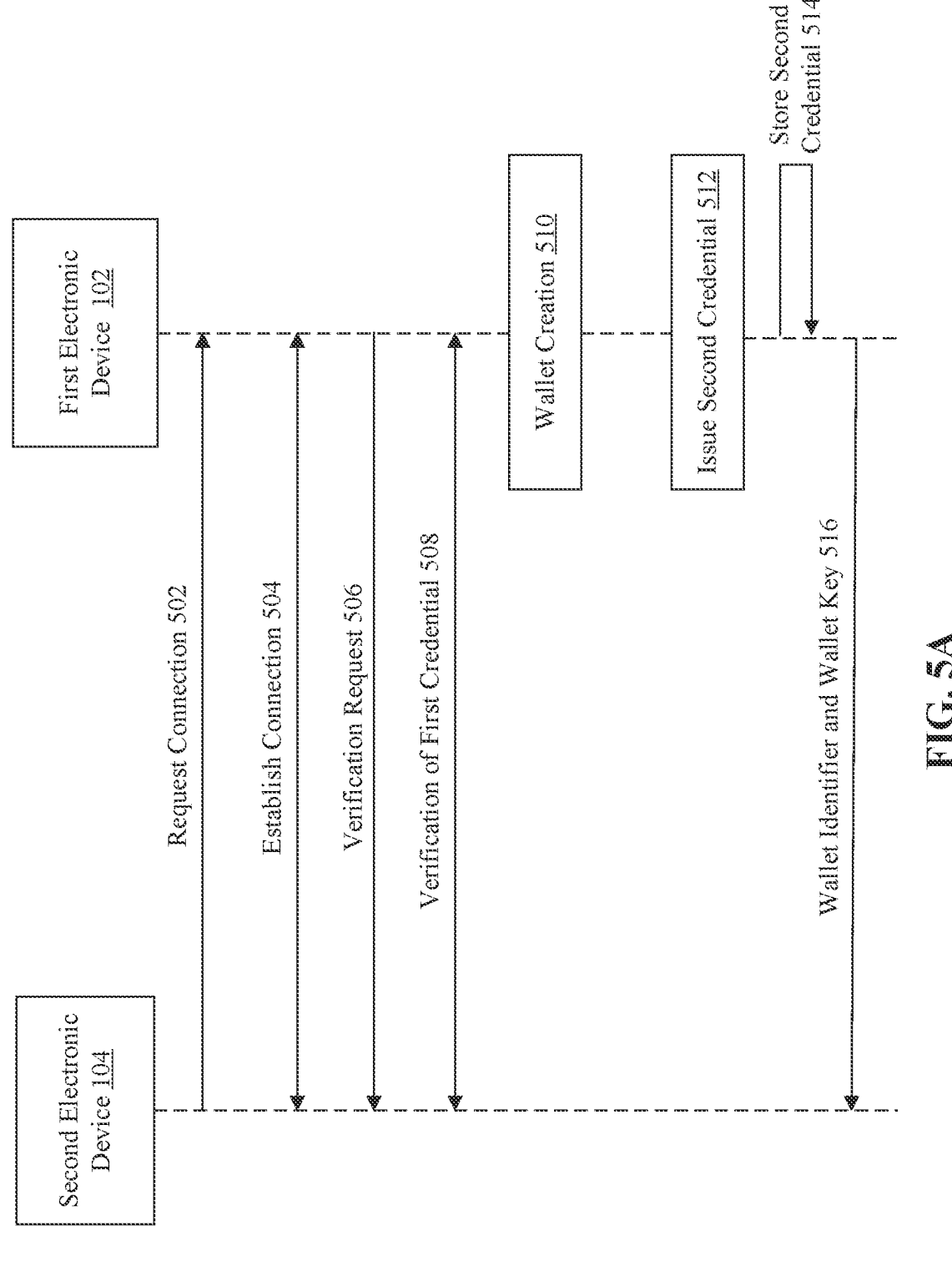
FIG. 5A is an exemplary sequence diagram that illustrates establishment of connection between a first electronic device and a second electronic device based on a distributed identity (DID), in accordance with an embodiment of the disclosure.

FIG. 5A is an exemplary sequence diagram that illustrates establishment of connection between first electronic device and the second electronic device based on a distributed identity (DID), in accordance with an embodiment of the disclosure. FIG. 5A is explained in conjunction with elements from FIGS. 1, 2, 3A, 3B, 4A, and 4B. With reference to FIG. 5A, there is shown a sequence diagram 500A that illustrates a sequence of operations from 502 to 516. The sequence of operations may be executed by various nodes of the network environment 100 (such as, the first electronic device 102, and the second electronic device 104 of FIG. 1).

At 502, a request of connection may be received. The first electronic device 102 may receive a connection request from the second electronic device 104. The connection request may be received to establish a connection between the first electronic device 102 and the second electronic device 104 to share credentials data and wallet information. Further, the connection request of the second electronic device 104 may include the first credentials stored at the second electronic device 104. Further, the first credentials may be issued by the issuer node 116. In an embodiment, the connection request may be received and accepted by both the first electronic device 102 and the second electronic device 104 to initiate the services such as, data sharing, revenue sharing, and logistic services. In an embodiment, the first credentials included in the connection request may be associated with the first user.

At 504, a connection may be established. The first electronic device 102 may be configured to establish a connection (such as, a DID connection) with the second electronic device 104, based on the received connection request. Further, the connection may be established to share credentials and verification of credentials between the first electronic device 102 and the second electronic device 104. In an embodiment, the connection established may be a wired connection or a wireless connection.

At 506, a verification request may be transmitted. The first electronic device 102 may be configured to transmit a verification request for the first credentials associated with the first user. The verification request may include a set of requirements of the first credentials that is issued by issuer node 116. Further, the verification request may be transmitted to the second electronic device 104, based on the connection established between the first electronic device 102 and the second electronic device 104. Further, the second electronic device 104 may be configured to verify the first credentials, based on the stored first credentials. In an embodiment, the verification request may be associated with the verification of, at least one of, the first credentials issued by the issuer node 116 to the second electronic device 104, the second credentials, or the third credentials.

At 508, a verification status may be shared. The first electronic device 102 may be configured to receive the verification status of the first credentials associated with the first user, from the second electronic device 104. The verification status may correspond to the verification of the first credentials by the second electronic device 104, based on the received verification request.

At 510, a first wallet account may be created. The first electronic device 102 may be configured to create the first wallet account for the first user associated with the second electronic device 104. The first wallet account may be created at the verifier-end 102B of the first electronic device 102. Further, the verifier-end 102B of the first electronic device 102 may be configured to load the created first wallet account with the first credentials issued by the issuer node 116. The verifier-end may be configured to transmit the loaded first wallet account to the user end (e.g., the EUCA 102A) of the first electronic device 102. The EUCA 102A of the first electronic device 102 may be configured to establish a connection with the verifier-end 102B of the first electronic device 102. The connection may be established to share credentials, verification status and/or first wallet account between the EUCA 102A of the first electronic device 102 and the verifier-end 102B of the first electronic device 102.

At 512, a second credentials may be generated. The verifier-end 102B of the first electronic device 102 may be configured to create the second credentials, based on the created first wallet account (at 510). Further, the verifier-end 102B of the first electronic device 102 may be configured to transmit the generated second credentials to the EUCA 102A of the first electronic device 102, based on the connection established between the verifier-end and the EUCA 102A of the first electronic device 102. Examples of the generated second credentials, may include, but are not limited to, certain attributes, for example, ID of organization, organization name, admin username (such as the personnel associated with the organization), email address of admin, role, and responsibility of the admin.

At 514, the second credentials may be stored. The EUCA 102A of the first electronic device 102 may be configured to receive the generated second credentials (at 512). Further, the EUCA 102A of the first electronic device 102 may be configured to store the generated second credentials, based on the received second credentials. For example, the generated second credentials may be stored in the memory 306A of the first electronic device 102.

At 516, a wallet identifier and a wallet key may be transmitted. The first electronic device 102 may be configured to transmit the wallet identifier and the wallet key associated with the first wallet account (at 510) to the second electronic device 104. The wallet identifier and the wallet key may be transmitted to the second electronic device 104 by the verifier-end 102B of the first electronic device 102, based on the second credentials (at 512). The transmission of the wallet identifier and the wallet key may leverage a DID messaging system to access the first wallet account (that may be loaded with the first credentials). Further steps for establishment of connection between first electronic device 102 and the second electronic device 104 based on DID are described, for example, in FIGS. 5B and 5C.

Figure 5B:
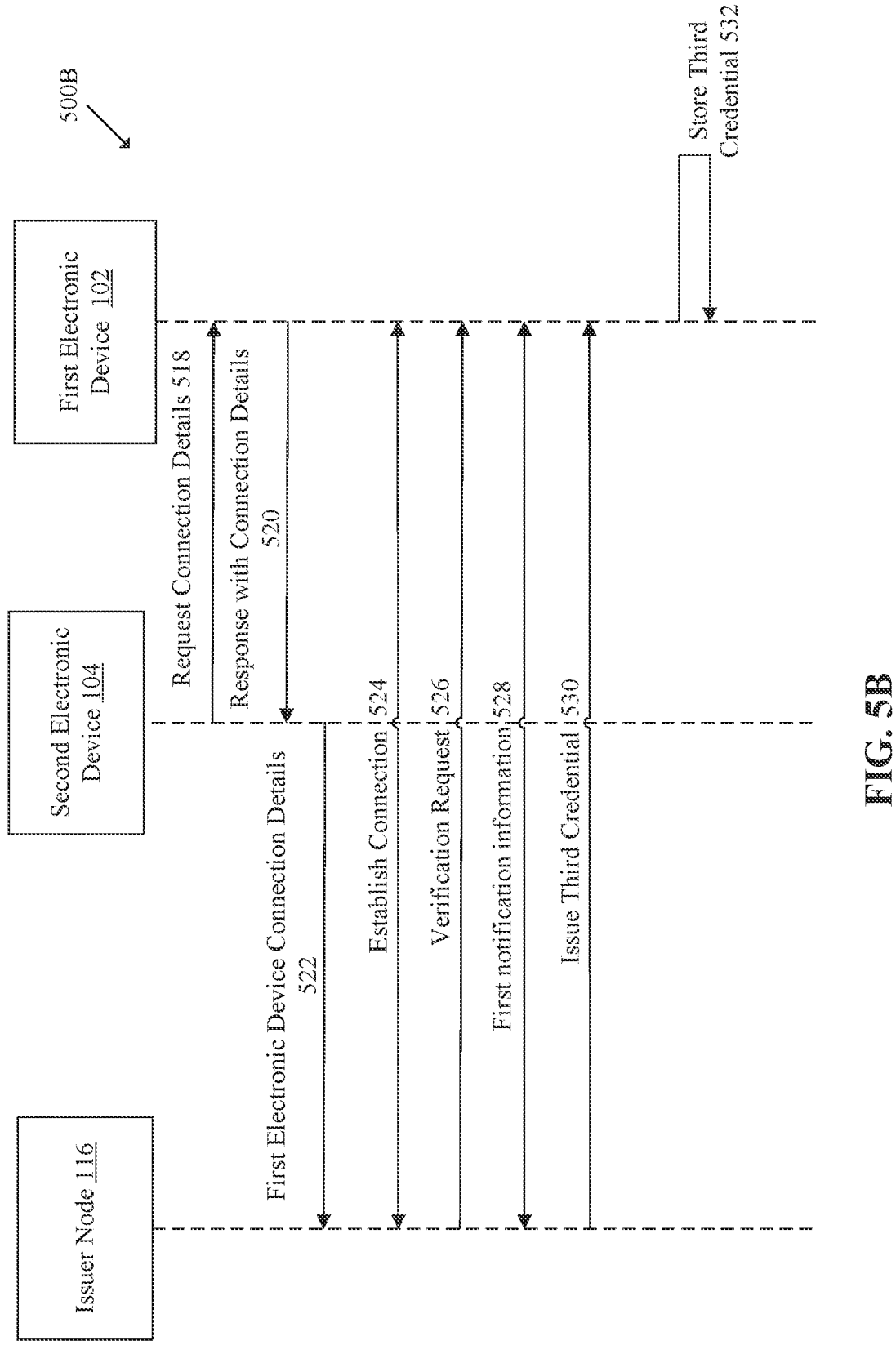
FIG. 5B is an exemplary sequence diagram that illustrates establishment of connection between a first electronic device, a second electronic device and an issuer node based on DID, in accordance with an embodiment of the disclosure.

FIG. 5B is an exemplary sequence diagram that illustrates establishment of connection between a first electronic device, a second electronic device, and an issuer node based on DID, in accordance with an embodiment of the disclosure. FIG. 5B is explained in conjunction with elements from FIGS. 1, 2, 3A, 3B, 4A, 4B and 5A. With reference to FIG. 5B, there is shown a sequence diagram 500B that illustrates a sequence of operations from 518 to 532. The sequence of operations may be executed by various nodes of the network environment 100 (such as, the first electronic device 102, the second electronic device 104, and the issuer node 116 of FIG. 1).

At 518, a request for connection details may be received. The first electronic device 102 may receive the connection details request from the second electronic device 104. The connection details request may be received to retrieve connection information along with details related to the first wallet account. The connection details request may be triggered by the second electronic device 104 on the reception of the wallet identifier and the wallet key from the verifier-end 102B of the first electronic device 102. For example, an API of the second electronic device 104 may call for an API of the EUCA 102A of the first electronic device 102 to establish a connection between the first electronic device 102 and the issuer node 116 (at 524).

At 520, a response to connection details request may be transmitted. The first electronic device 102 may transmit a response with the connection details to the second electronic device 104, based on the received connection detail request. The connection details may correspond to connection information of the first electronic device 102 and the second electronic device 104 along with the details related to generated first wallet account. The connection detail may include the second credentials stored at the EUCA 102A of the first electronic device 102. Further, the second credentials may be generated by the verifier-end 102B of the first electronic device 102.

At 522, connection details of the first electronic device may be transmitted. The second electronic device 104 may be configured to transmit the connection details of the first electronic device 102 to the issuer node 116, based on the received connection details (at 520). The connection details of the first electronic device 102 may correspond to connection information of the first electronic device 102 and the second electronic device 104 along with the details related to the generated first wallet account. Further, the connection details may include the second credentials stored at the user end (e.g., the EUCA 102A) of the first electronic device 102. For example, a DID agent of the second electronic device 104 may be configured to transmit connection details of the first electronic device 102 to the issuer node 116 using a DID messaging system.

At 524, a connection may be established. The first electronic device 102 may be configured to establish a connection with the issuer node 116, based on the stored second credentials. For example, the issuer node 116 may trigger the establishment of connection with the first electronic device

102, upon reception of the connection details of the first electronic device 102 from the second electronic device 104. In an embodiment, the connection established may be a wired connection or a wireless connection. For example, the connection established may be between the issuer node 116 and the EUCA 102A of the first electronic device 102, based on the received connection details (connection details transmitted using a DID messaging system).

At 526, verification request may be received. The first electronic device 102 may be configured to receive the verification request for the second credentials associated with the first user. Further, the verification request may be transmitted by the issuer node 116, based on the connection established between the first electronic device 102 and the issuer node (at 524). Further, the verification request may include the requirement of the second credentials (that is issued by the verifier-end of the first electronic device 102).

At 528, first notification information may be received. The first electronic device 102 may be configured to receive the first notification information including the first verification status of the generated second credentials. The first notification information may be received from the issuer node 116. The first verification status may correspond to the verification of the second credentials. Further, the second credentials may be verified by the first electronic device 102, based on the stored second credentials.

At 530, third credentials may be generated. The issuer node 116 may be configured to generate the third credentials, based on the received first notification information (at 528) and connection details of the first electronic device 102 (at 522). Further, the user end (e.g., the EUCA 102A) of the first electronic device 102 may be configured to receive the generated third credentials, based on the first notification information (at 528). In an embodiment, the issuer node 116 may use the second credentials to generate the third credentials.

At 532, third credentials may be stored. The EUCA 102A of the first electronic device 102 may be configured to store the third credentials, based on the reception of the generated third credentials (at 530). In an embodiment, the third credentials may be stored by the first electronic device 102, based on a pre-established trust-based association between the issuer node 116 and the first electronic device 102.

Figure 5C:
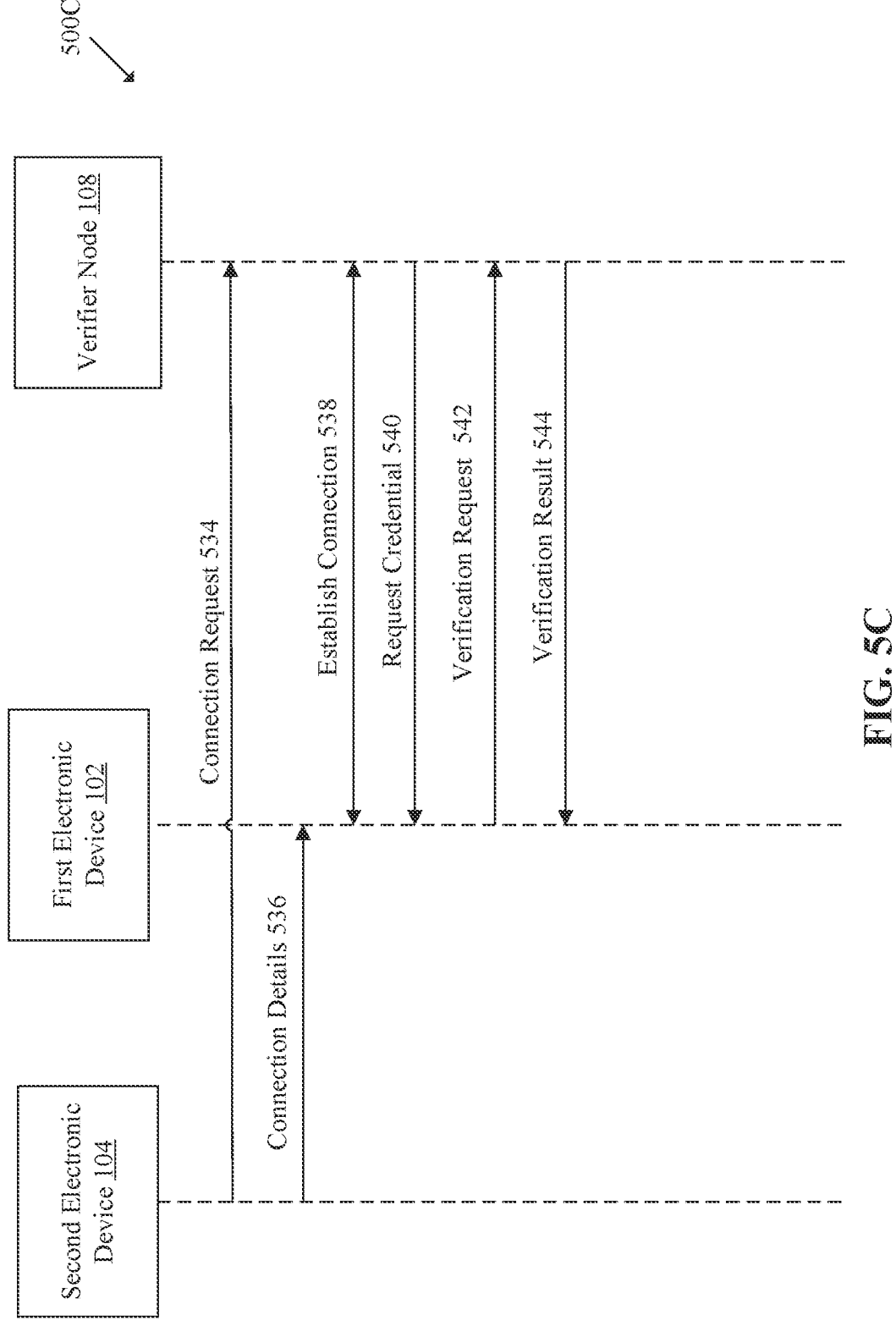
FIG. 5C is an exemplary sequence diagram that illustrates establishment of connection between a first electronic device, a second electronic device and a verifier node based on DID, in accordance with an embodiment of the disclosure.

FIG. 5C is an exemplary sequence diagram that illustrates establishment of connection between a first electronic device, a second electronic device and a verifier node based on DID, in accordance with an embodiment of the disclosure. FIG. 5B is explained in conjunction with elements from FIGS. 1, 2, 3A, 3B, 4A, 4B, 5A and 5B. With reference to FIG. 5C, there is shown a sequence diagram 500B that illustrates a sequence of operations from 534 to 544. The sequence of operations may be executed by various nodes of the network environment 100 (such as, the first electronic device 102, the second electronic device 104, and the verifier node 108 of FIG. 1).

At 534, a request for connection may be transmitted. The second electronic device 104 may transmit the connection request to the verifier node 108. In an embodiment, the verifier node 108 may be an external verifier node corresponding to an electronic device other than the first electronic device 102. The connection request transmission may be triggered upon reception of the connection details from the first electronic device 102 (at 520). Further, the connection request may include the first credentials stored at the second electronic device 104, for example, in the memory 306B.

At 536, connection details may be transmitted. The second electronic device 104 may transmit the connection details of the second electronic device 104 to the first electronic device 102, based on the transmission of the connection request to the verifier node 108 (at 534), upon reception of the connection details from the first electronic device 102 (at 520). The connection details may correspond to connection information of the second electronic device 104 and the issuer node 116. Further, the connection details may include the first credentials associated with the first user.

At 538, a connection may be established. The first electronic device 102 may be configured to establish connection with the verifier node 108, upon reception of the connection details of the second electronic device 104. In an embodiment, the connection established may be a wired connection or a wireless connection. In an embodiment, the connection may be established between the EUCA 102A of the first electronic device 102 and the verifier node 108.

At 540, a credentials request may be received. The first electronic device 102 may be configured to receive a request for credentials, based on the connection established (at 538) and reception of the connection request from the second electronic device 104 (at 534). Further, the credentials request may correspond to request for the stored third credentials. The connection request may include the first credentials. In an embodiment, the credentials request may be received by the EUCA 102A of the first electronic device 102.

At 542, a verification request for third credentials may be transmitted. The first electronic device 102 may be configured to transmit the verification request of the stored third credentials to the verifier node 108. The verification request may be transmitted based on the established connection (at 538) and upon reception of the credentials request (at 540). In an embodiment, the verification request may be transmitted by the EUCA 102A of the first electronic device 102 to the verifier node 108.

At 544, a verification result may be received. The first electronic device 102 may be configured to receive a verification result, based on the connection request from the second electronic device 104 and the transmitted third credentials. Further, the verification result may correspond to the verification of the third credentials. The third credentials may be verified based on the reception of the connection request (at 534). Further, the connection request may include the first credentials stored at the second electronic device 104. Further, the verifier node 108 may be configured to verify (for example, based on a DID-based verification technique) the received third credentials (from the first electronic device 102) corresponding to the received first credentials (from the second electronic device 104). In an embodiment, the verification result may be received by the EUCA 102A of the first electronic device 102.

FIG. 6 illustrates an exemplary flowchart of a method for DID based establishment of connection between electronic devices, in accordance with an embodiment of the disclosure. FIG. 6 is described in conjunction with elements from FIGS. 1, 2, 3A, 3B, 4A, 4B, 5A, 5B and 5C. With reference to FIG. 6, there is shown a flowchart 600. The exemplary method of the flowchart 600 may be executed by any computing system, for example, by the first electronic device 102 of FIG. 1. The exemplary method of the flowchart 600 may start at 602 and proceed to 604.

At 604, the first wallet account may be created for the first user associated with the second electronic device 104, based on the first credentials associated with the first user. The processor 308A of the first electronic device 102 may be configured to create the first wallet account for the first user associated with the second electronic device 104, based on the first credentials associated with the user. The first credentials may be issued by the issuer node 116 to the second electronic device 104. Further, the first wallet account for the first user may be created at the verifier-end 102B of the first electronic device 102. Further, the verifier-end 102B of the first electronic device 102 may be configured to transmit the created first wallet account to the EUCA 102A of the first electronic device 102. Furthermore, the EUCA 102A of the first electronic device 102 may be configured to store the first wallet account created for the first user, based on the reception of the created first wallet account. Further, the first wallet account may allow a user to manage and access the first credentials and/or the second credentials. Herein, the first wallet account may correspond to, but is not limited to, gift cards, debit card details, credit card details, membership cards, loyalty cards, coupons, tickets, licenses, ID cards, and access keys. Details related to the first wallet account are further described, for example, in FIG. 4A (at 402).

At 606, the second credentials may be generated based on the created first wallet account associated with the first user. The processor 308A of the first electronic device 102 may be configured to generate the second credentials associated with the first user, based on the creation of the first wallet account associated with the first user. Examples of the generated second credentials, may include, but are not limited to, certain attributes, for example, ID of organization, organization name, admin username (such as the personnel associated with the organization), email address of admin, role, and responsibility of the admin. It may be appreciated that the generated second credentials may correspond to the verified first credentials to establish a credentials synchronization between the first electronic device 102 and the second electronic device 104. Further, the second credentials may also be associated with the created first wallet account. Further, the processor 308A of the first electronic device 102 may be configured to store the generated second credentials at the user end (e.g., the EUCA 102A) of the first electronic device 102. Thus, a decentralized control of the first credentials and/or the second credentials may be available for a user. The user may be able to control when, what, where, and how long the first credentials and/or second credentials may to be shared with the first electronic device 102 or the second electronic device 104. Details related to the second credentials are further described, for example, in FIG. 4A (at 404).

At 608, the first notification information including a first verification status of the generated second credentials may be received. The processor 308A of the first electronic device 102 may be configured to receive the first notification information including the first verification status of the generated second credentials (at, 404). Further, the first verification status may correspond to verification of the second credentials by the second electronic device 104, based on the verified first credentials. Details related to the first notification information are further described, for example, in FIG. 4A (at 406).

At 610, the third credentials associated with the first user may be generated, based on the first verification status of the generated second credentials. The processor 308A of the first electronic device 102 may be configured to generate the third credentials associated with the first user, based on the first verification status of the generated second credentials Examples of the generated third credentials, may include, but are not limited to, certain attributes, for example, ID of organization, organization name, admin username (such as the personnel associated with the organization), email address of admin, role, and responsibility of the admin. Details related to the third credentials are further described, for example, in FIG. 4A (at 408).

At 612, the second notification information including a second verification status of the generated third credentials may be received. The processor 308A of the first electronic device 102 may be configured to receive the second notification information including the second verification status of the generated third credentials (at, 408). The second verification status may correspond to verification of the third credentials by the second electronic device 104, based on the verified second credentials. Details related to the second notification information are further described, for example, in FIG. 4A (at 410).

At 614, the generated third credentials may be stored, based on the second verification status of the generated third credentials. The processor 308A of the first electronic device 102 may be configured to the store third credentials, based on the second verification status of the generated third credentials. The third credentials may also be associated with the created first wallet account. The first wallet account may allow a user to manage and access the first credentials and/or the second credentials. Furthermore, the first credentials, the second credentials, and the third credentials may include the same license key. Details related to the storage of the third credentials are further described, for example, in FIG. 4A (at 412). A connection may be established between the first electronic device 102 and the second electronic device 104 based on a DID-based authentication technique, as described further, for example, in FIG. 5A-5C. Further, the control may pass to end.

Although the flowchart 600 is illustrated as discrete operations, such as 604, 606, 608, 610, 612, and 614, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the first electronic device 102). Such instructions may cause the first electronic device 102 to perform operations that may include creation of a first wallet account for a first user associated with a second electronic device (e.g., the second electronic device 104), based on a first credentials associated with the first user. The operations may further include generation of the second credentials associated with the first user, based on the creation of the first wallet account associated with the first user. The operations may further include reception of the first notification information including a first verification status of the generated second credentials. The operations may further include generation of the third credentials associated with the first user, based on the first verification status of the generated second credentials. The operations may further include reception of the second notification information including a second verification status of the generated third credentials. The operations may further include storage of the generated third credentials on the first electronic device 102, based on the second verification status of the generated third credentials. The second electronic device 104 may be configured to establish a connection with the first electronic device 102 using the stored third credentials.

Exemplary aspects of the disclosure may provide an electronic device (such as, a first electronic device of FIG. 1) that includes circuitry (such as, the processor 308A). The processor 308A may be configured to create a first wallet account for a first user associated with a second electronic device (e.g., the second electronic device 104), based on a first credentials associated with the first user. Further, the processor 308A may be configured to generate a second credentials associated with the first user, based on the creation of the first wallet account associated with the first user. Further, the processor 308A may be configured to receive a first notification information including a first verification status of the generated second credentials. Further, the processor 308A may be configured to generate a third credentials associated with the first user, based on the first verification status of the generated second credentials. Further, the processor 308A may be configured to receive a second notification information including the second verification status of the generated third credentials. Further, the processor 308A may be configured to store the generated third credentials on the first electronic device 102, based on the second verification status of the generated third credentials. Further, the second electronic device 104 may be configured to establish a connection with the first electronic device 102 using the stored third credentials.

In an embodiment, the processor 308A may be configured to verify the first credentials associated with the first user of the second electronic device 104, based on the stored third credentials.

In an embodiment, the verified first credentials may correspond to each of the verified second credentials and the verified third credentials to establish credentials synchronization between the first electronic device 102 and the second electronic device 104.

In an embodiment, the created first wallet account associated with the first user may be configured based on the verified first credentials.

In an embodiment, the processor 308A may be configured to transmit third notification information including the wallet identifier and the wallet key to the second electronic device 104, based on the generated second credentials associated with the first user.

In an embodiment, the processor 308A may be configured to establish a connection with the second electronic device 104, based on the transmitted third notification information.

In an embodiment, the processor 308A may be configured to receive fourth notification information including connection information of the first electronic device 102 and the second electronic device 104, based on the first credentials and the transmitted first notification information.

In an embodiment, the processor 308A may be configured to establish the connection with a verifier node (e.g., the verifier node 108), based on the received fourth notification.

In an embodiment, the processor 308A may be configured to receive the request for credentials from the verifier node 108, based on the established connection with the verifier node 108.

In an embodiment, the processor 308A may be configured to transmit the stored third credentials to the verifier node 108, based on the received request for credentials. Further, the verifier node 108 may receive the connection request from the second electronic device 104. The connection request may correspond to the third credentials.

In an embodiment, the processor 308A may be configured to receive a verification result of the third credentials, based on the connection request from the second electronic device 104 and the transmitted third credentials. The second electronic device 104 may be configured to establish the connection with the first electronic device 102 further based on the received verification result.

In an embodiment, the first electronic device 102 may correspond to a cloud agent of the network (e.g., the communication network 110). Further, the second electronic device 104 may correspond to a user agent of the network (e.g., the communication network 110). Furthermore, the connection established between the first electronic device 102 and the second electronic device 104 may correspond to a distributed identity (DID)-based connection.

In an embodiment, the network (e.g., the communication network 110) may include a set of nodes including the first electronic device 102 and the second electronic device 104. Further, the network (e.g., the communication network 110) may further include at least one of an issuer node (e.g., the issuer node 202) associated with the credentials issuing authority, a set of holder nodes (e.g., the holder node 204) corresponding to the set of nodes of the network (e.g., the communication network 110), the verifier node 206 associated with the set of nodes of the network (e.g., the communication network 110), and a distributed ledger (e.g., the distributed ledger 208) associated with the network (e.g., the communication network 110).

In an embodiment, each of the issuer node (e.g., the issuer node 202), the set of holder nodes, and the verifier node 206 may be associated with the distributed ledger 208 and may include a corresponding distributed identity (DID) agent.

In an embodiment, the issuer node 202 may be configured to generate credentials associated with each holder node of the set of holder nodes.

In an embodiment, the generated credentials may correspond to a set of attributes including at least one of: the organization name, the organization ID, the name and electronic-mail ID of the administrator user, the role of the user of the node, or the user privilege level associated with the user of the node.

In an embodiment, the verifier node 206 is configured to receive the credentials verification request associated with a first node from at least one of the first electronic device 102 or the second electronic device 104. Further, the verifier node 206 may be configured to query the holder node of the set of holder nodes for verified credentials of the first node, based on the received credentials verification request. Further, the verifier node 206 may be configured to receive, from the holder node 204, the verified credentials of the first node, based on the query. The DID of the first node may be verified based on the received verified credentials of the first node.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A first electronic device, comprising:
   circuitry configured to:
      generate, based on first credentials associated with a user, wallet account for the user associated with a second electronic device, wherein
         the wallet account is on a digital wallet application, and
         an issuer node generates the first credentials;
      generate second credentials associated with the user, based on the generation of the wallet account;
      establish a connection between the first electronic device and the issuer node based on a call between an API (application programming interface) of the second electronic device and an API of the first electronic device;
      receive a verification request for the second credentials based on the established connection between the first electronic device and the issuer node;
      receive, based on the reception of the verification request, first notification information that includes a first verification status of the generated second credentials;
      generate third credentials associated with the user, based on the first verification status of the generated second credentials;
      receive second notification information that includes a second verification status of the generated third credentials; and
      store the generated third credentials on the first electronic device, based on the second verification status of the generated third credentials, wherein the second electronic device establishes a connection with the first electronic device based on the stored third credentials.

2. The first electronic device according to claim 1, wherein the circuitry is further configured to verify, based on the stored third credentials, the first credentials associated with the user of the second electronic device.

3. The first electronic device according to claim 2, wherein the circuitry is further configured to establish credentials synchronization between the first electronic device and the second electronic device, based on the verified first credentials that correspond to each of the second credentials and the third credentials.

4. The first electronic device according to claim 2, wherein a configuration of the wallet account is based on the verified first credentials.

5. The first electronic device according to claim 1, wherein the circuitry is further configured to:

transmit, based on the generated second credentials associated with the user, third notification information including a wallet identifier and a wallet key to the second electronic device; and establish a connection with the second electronic device, based on the transmitted third notification information.

6. The first electronic device according to claim 5, wherein the circuitry is further configured to:

receive, based on the first credentials and the first notification information, fourth notification information including connection information of the first electronic device and the second electronic device;

establish a connection with a verifier node, based on the received fourth notification;

receive a request for the third credentials from the verifier node, based on the established connection with the verifier node;

transmit the stored third credentials to the verifier node, based on the received request for the third credentials, wherein the verifier node receives a connection request from the second electronic device, and the connection request corresponds to the third credentials; and receive a verification result of the third credentials, based on the connection request from the second electronic device and the transmitted third credentials, wherein the second electronic device establishes the connection with the first electronic device further based on the received verification result.

7. The first electronic device according to claim 6, wherein the first electronic device corresponds to a cloud agent, the second electronic device corresponds to a user agent, and the connection established between the first electronic device and the second electronic device corresponds to a distributed identity (DID)-based connection.

8. The first electronic device according to claim 7, wherein:

the issuer node is associated with a credentials issuing authority, one of the first electronic device or the second electronic device is associated with a set of holder nodes, the set of holder nodes stores each of the first credentials, the second credentials, and the third credentials, the verifier node is associated with the set of holder nodes, and the circuitry is configured to communicate with a distributed ledger.

9. The first electronic device according to claim 8, wherein each of the issuer node, the set of holder nodes, and the verifier node is associated with the distributed ledger, and the each of the issuer node, the set of holder nodes, and the verifier node includes a respective distributed identity (DID) agent.

10. The first electronic device according to claim 8, wherein the issuer node generates the each of the first credentials, the second credentials, and the third credentials, and the each of the first credentials, the second credentials, and the third credentials is associated with each of the set of holder nodes.

11. The first electronic device according to claim 10, wherein the each of the first credentials, the second credentials, and the third credentials correspond to a set of attributes, and the set of attributes includes at least one of an organization name, an organization ID, a name of an administrator user and electronic-mail ID of the administrator user, a role of a user of a node, or a user privilege level associated with a user of a node.

12. A method, comprising:

in a first electronic device:

generating, based on first credentials associated with a user, wallet account for the user associated with a second electronic device, wherein the wallet account is on a digital wallet application, and an issuer node generates the first credentials;

generating second credentials associated with the user, based on the generation of the wallet account;

establishing a connection between the first electronic device and the issuer node based on a call between an API (application programming interface) of the second electronic device and an API of the first electronic device;

receiving a verification request for the second credentials based on the established connection between the first electronic device and the issuer node;

receiving, based on the reception of verification request, first notification information including a first verification status of the generated second credentials;

generating third credentials associated with the user, based on the first verification status of the generated second credentials;

receiving second notification information including a second verification status of the generated third credentials; and storing the generated third credentials on the first electronic device, based on the second verification status of the generated third credentials, wherein the second electronic device establishes a connection with the first electronic device based on the stored third credentials.

13. The method according to claim 12, further comprising verifying, based on the stored third credentials, the first credentials associated with the user of the second electronic device.

14. The method according to claim 13, further comprising establishing credentials synchronization between the first electronic device and the second electronic device, based on the verified first credentials that correspond to each of the second credentials and the third credentials.

15. The method according to claim 13, wherein a configuration of the wallet account is based on the verified first credentials.

16. The method according to claim 12, further comprising:

transmitting, based on the generated second credentials associated with the user, third notification information including a wallet identifier and a wallet key to the second electronic device; and establishing a connection with the second electronic device, based on the transmitted third notification information.

17. The method according to claim 16, further comprising:

receiving, based on the first credentials and the first notification information, fourth notification information including connection information of the first electronic device and the second electronic device;

establishing a connection with a verifier node, based on the received fourth notification;

receiving a request for the third credentials from the verifier node, based on the established connection with the verifier node;

transmitting the stored third credentials to the verifier node, based on the received request for the third credentials, wherein the verifier node receives a connection request from the second electronic device, and the connection request to the third credentials; and receiving a verification result of the third credentials, based on the connection request from the second electronic device and the transmitted third credentials, wherein the second electronic device establishes the connection with the first electronic device further based on the received verification result.

18. The method according to claim 12, wherein the first electronic device corresponds to a cloud agent device, the second electronic device corresponds to a user agent device, and the connection established between the first electronic device and the second electronic device corresponds to a distributed identity (DID)-based connection.

19. A non-transitory computer-readable medium having stored thereon, computer-executable instructions that when executed by a first electronic device, causes the first electronic device to execute operations, the operations comprising:

generating, based on first credentials associated with a user, a wallet account for a user associated with a second electronic device, wherein the wallet account is on a digital wallet application, and an issuer node generates the first credentials;

generating second credentials associated with the user, based on the generation of the wallet account;

establishing a connection between the first electronic device and the issuer node based on a call between an API (application programming interface) of the second electronic device and an API of the first electronic device;

receiving a verification request for the second credentials based on the established connection between the first electronic device and the issuer node;

receiving, based on the reception of verification request, first notification information including a first verification status of the generated second credentials;

generating third credentials associated with the user, based on the first verification status of the generated second credentials;

receiving second notification information including a second verification status of the generated third credentials; and storing the generated third credentials on the first electronic device, based on the second verification status of the generated third credentials, wherein the second electronic device establishes a distributed identity (DID)-based connection with the first electronic device using the stored third credentials.

* * * * *